United States Patent [19]
Waki et al.

[11] Patent Number: 6,134,351
[45] Date of Patent: Oct. 17, 2000

[54] IMAGE PROCESSING DEVICE PERFORMING THE CONVERSION OF GRADATION VALUE BY MEANS OF ERROR DIFFUSION METHOD

[75] Inventors: Hiroyuki Waki, Hirakata; Shinji Inoue, Neyagawa; Satoru Hayama, Kobe; Masahiro Oashi; Mitsuko Fujita, both of Hirakata; Hiroki Nakamura, Moriguchi; Tatsuya Shimoji, Neyagawa; Akira Ishikawa, Osaka, all of Japan

[73] Assignee: Matsushita Electric Industrial Co., Ltd., Osaka, Japan

[21] Appl. No.: 08/975,851

[22] Filed: Nov. 20, 1997

[30] Foreign Application Priority Data

Nov. 20, 1996 [JP] Japan ................. 8-326151

[51] Int. Cl.$^7$ ................. H04N 1/40
[52] U.S. Cl. ................. 382/252; 382/253
[58] Field of Search ................. 382/251–253; 395/109; 358/1.9, 448, 456, 458

[56] References Cited

U.S. PATENT DOCUMENTS

| | | | |
|---|---|---|---|
| 4,734,770 | 3/1988 | Matsuba | 358/167 |
| 4,955,065 | 9/1990 | Ulichney | 382/50 |
| 5,745,660 | 4/1998 | Kolpatzik et al. | 395/108 |
| 5,781,176 | 7/1998 | Rey et al. | 345/147 |
| 5,838,462 | 11/1998 | Ebner et al. | 358/456 |
| 5,859,955 | 1/1999 | Wang | 395/109 |

*Primary Examiner*—Thomas D. Lee
*Assistant Examiner*—Stephen Brinich
*Attorney, Agent, or Firm*—Price, Gess & Ubell

[57] ABSTRACT

When gradation values of an original image are converted, a pixel data read unit reads out a piece of pixel data, and a pixel data conversion unit converts the gradation value of the piece of pixel data. A condition judging unit decides whether a pixel corresponding to the piece of pixel data satisfies a predetermined condition, and a data conversion correction unit corrects by a stochastic process the conversion performed by the pixel data conversion unit when the condition judging unit decides that the piece of pixel data satisfies the predetermined condition.

20 Claims, 32 Drawing Sheets

| VALUE RANGES(I) | f(I) | g(I) |
|---|---|---|
| FROM 0 TO 40 | 0 | 40 |
| FROM 40 TO 80 | 40 | 80 |
| FROM 80 TO 120 | 80 | 120 |
| FROM 120 TO 160 | 120 | 160 |
| FROM 160 TO 200 | 160 | 200 |
| FROM 200 TO 255 | 200 | 255 |

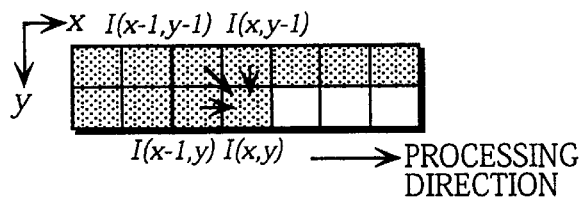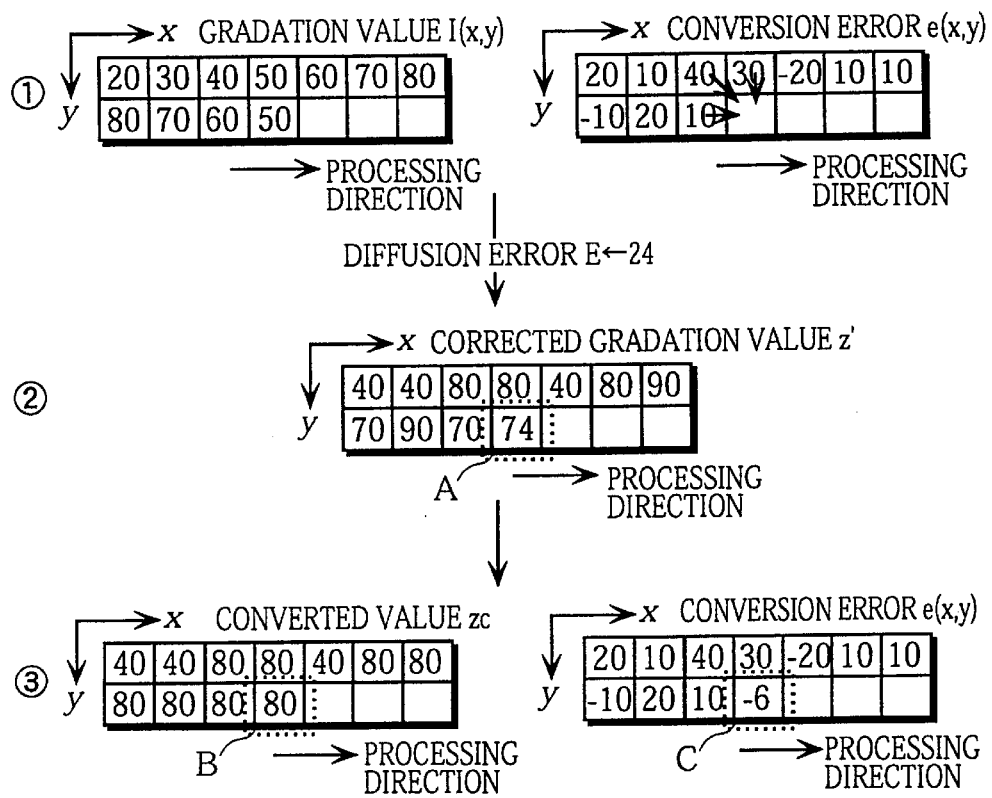

FLOYD-TYPE FILTER

Fig. 11 PRIOR ART
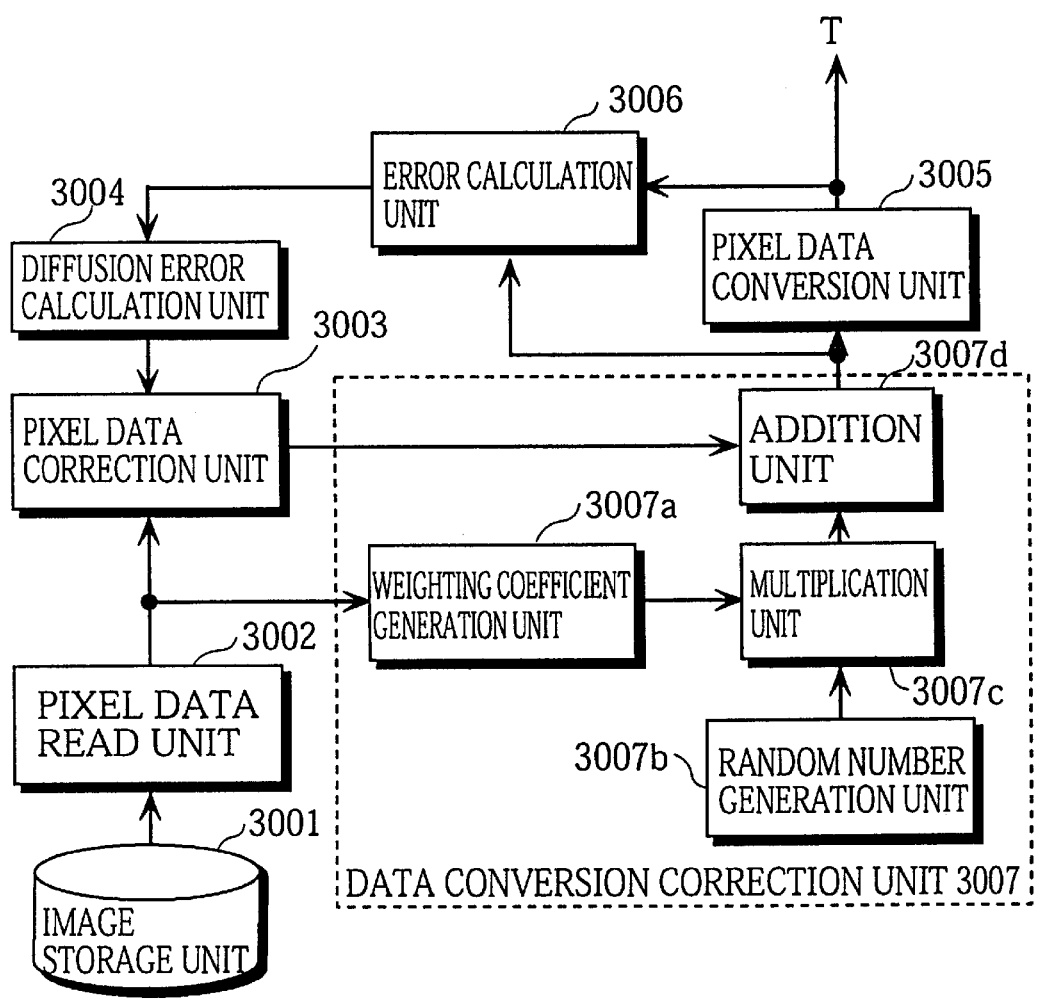

PRIOR ART
FIG. 17A
PRIOR ART
FIG. 17B
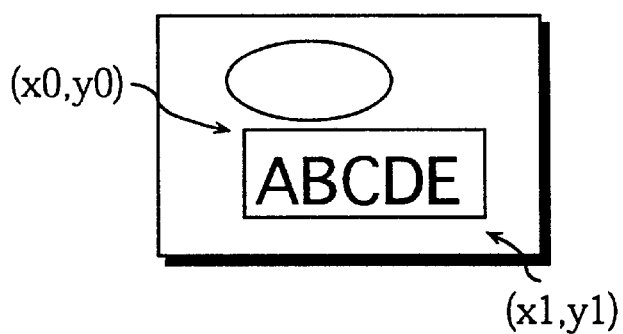
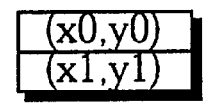

| VALUE RANGES(I) | f(I) | g(I) |
|---|---|---|
| FROM 0 TO 255 | 0 | 255 |

GRADATION VALUE 0 → GRADATION VALUE 255

GRADATION VALUE 0 → GRADATION VALUE 255

GRADATION VALUE 0 → GRADATION VALUE 255

→ PROCESSING DIRECTION

IMAGE PROCESSING DEVICE PERFORMING THE CONVERSION OF GRADATION VALUE BY MEANS OF ERROR DIFFUSION METHOD

BACKGROUND OF THE INVENTION (1) Field of the Invention

The present invention relates to an image processing device and an image processing method, and especially relates to a binarization device, a subtractive color conversion device, a binarization method, and a subtractive color conversion method of multivalued images.

(2) Description of the Prior Art

With the recent developments in computer technology, digital image processing has become commonplace. A digitized image is generally expressed by matrix data having values according to the gradation (brightness) at each sampling point. Digital image processing is attained by the numerical calculation or the like for each gradation value.

One of the problems of digital image processing is that the gradation of an image displayed by one display device can not be reproduced accurately by another display device. For instance, when a monochrome printer prints out an image displayed by a high-performance color CRT display device, the printer reproduces the image, originally displayed with 256-level gradation for each of the three primary colors of light (red, blue, and green), only with two-level gradation, or dot and blank. This problem also occurs when a CRT display device having low gradation precision displays an image displayed by a high-performance CRT display device. Therefore, image processing is necessary in order to convert the gradation values of the original image when the image is reproduced by a display device having lower gradation precision.

An error diffusion method is generally used as an image processing method performing such a conversion of gradation values. The method is expressed by the following Equations from (1) to (4), where I(x,y) represents a graduation value of the pixel at point (x,y) of the original image, and G represents a conversion function (step function) of the graduation value, and g represents the conversion result.

$$I'(x,y) = I(x,y) + E \qquad \text{Equation (1)}$$

$$E = \sum_{i=m0}^{mi} \sum_{j=n0}^{ni} aij \cdot e(x+i, y+j) \qquad \text{Equation (2)}$$

provided $$\sum_{i=m0}^{ml} \sum_{j=n0}^{nl} aij = 1 \qquad \text{Equation (3)}$$

$$e(x, y) = I'(x, y) - g(x, y)$$

$$g(x,y) = G(I'(x,y)) \qquad \text{Equation (4)}$$

The error diffusion method reflects the conversion error at the pixels around a pixel in a piece or pixel data to be converted by adding a diffusion error E obtained by weighting and summing conversion errors e at the surrounding pixels. In the error diffusion method, the conversion error of the whole image is smaller than that in other conventional methods, by reflecting the conversion errors around every pixel in its pixel data.

FIG. 1 is a construction of an image proccesing device that uses the error diffusion method. The image processing device includes image storage unit 2001, pixel data read unit 2002, pixel data correction unit 2003, diffusion error calculation unit 2004, pixel data conversion unit 2005, and error calculation unit 2006.

The following is a brief explanation of the operation of each unit. Pixel data read unit 2002 reads out a piece of pixel data stored in image storage unit 2001, and outputs it to pixel data correction unit 2003. Diffusion error calculation unit 2004 calculates a diffusion error E from conversion errors e output from error calculation unit 2006, and transmits it to pixel data correction unit 2003. FIG. 2 shows error diffusion coefficient aij used in diffussion error calculation unit 2004, and an example of a process which uses this error diffusion coefficient. Error diffusion coefficient aij is calculated by Equation (2), where m0=-1, m1-1, n0=-1, and n1=0. Error diffusion coefficient aij varies according to the processing direction. The error diffusion coefficients of a present pixel and the pixels located ahead of it in the processing direction are set at 0. Therefore, the diffusion error E is only calculated from the conversion errors e located behind the pixel in the processing direction as shown in FIG. 2. Pixel data correction unit 2003 adds the diffusion error E calculated by diffusion error calculation unit 2004 to the pixel data output from pixel data read unit 2002, and corrects the gradation value of the pixel data. Pixel data conversion unit 2005 converts the corrected gradation value of the pixel data to the desired binary or multivalued value by means of a function, and outputs the value to terminal T. FIG. 3A and FIG. 3B shows an example of the conversion functions used by pixel data conversion unit 2005. FIG. 3A is a table showing values that may be set by two functions f(I) and g(I) within a given range or values. FIG. 3B is a graph showing functions f(I) and g(I). These conversion functions f(I) and g(I) used by pixel data conversion unit 2005 convert gradation data expressed with 256-level gradation to gradation data expressed with seven-level gradation. Specifically, one of the two converted values of functions f(I) and g(I), closer to the original value, is used.

The following is a more detailed explanation of the above operation using the flowcharts shown in FIGS. 4, 5, and 6. Firstly, an overall explanation of the operation is given using the flowchart in FIG. 4. The initial value of each conversion error is set at 0 (Step 2301). The first scanning line is then set as the line y is equal to 0. The image is scanned with the positive direction of the y-axis as the sub scanning direction and the x-axis as the main scanning direction, with the scanning direction being positive with regard to the x-axis when y is equal to 0 or an even number and negative when y is equal to an odd number, until the top of the image is reached. During scanning, pixel data read unit 2002 reads out the pixel data, and pixel conversion unit 2005 converts the pixel data (Step 2303 to Step 2307). Although the scanning direction of the x-axis switches according to the coordinate value of the y-axis in the above example, such switching is not necessary.

Secondly, a more detailed explanation of the operation in Step 2305 and Step 2306 is given using the flowcharts shown in FIGS. 5 and 6. FIG. 5 is a flowchart showing the operation for the pixel data conversion when the image is scanned in the positive direction of the x-axis. FIG. 6 is a flowchart showing the same operation when the image is scanned in the negative direction of the x-axis. The process in these flowcharts are almost the same, so that the process will only be explained using the flowchart shown in FIG. 5. FIG. 7A to FIG. 7C show a specific example of the conversion. FIG. 7A shows the conversion direction and the position of the pixel with the coordinates (x,y). FIG. 7B shows the error diffusion coefficient aij used by diffusion error calculation unit 2004. FIG. 7C shows the conversion error e of each piece of converted pixel value and how the gradation value I of each piece of pixel data expressed with 256-level gradation is converted.

The coordinate value in the x-axis of the pixel scanned first is set at 0. The following process is performed on each scanning line in the x-axis (Step 2402 to step 2410). Pixel data correction unit 2005 substitutes the gradation value I(x,y) of the pixel positioned at coordinates (x,y) into the variable z (Step 2403). Diffusion error calculation unit 2004 calculates the diffusion error E using Equation (2) (Step 2404). For instance, the diffusion error E is calculated to be "24", using the error diffusion coefficient aij in FIG. 7B with the conversion errors c in FIG. 7C①. Pixel data correction unit 2003 uses Equation (1) to correct the pixel data by adding the diffusion error E to the variable z, into which the gradation value of the pixel data has been substituted (Step 2405). The gradation value "50" of the pixel data corresponding to the pixel positioned at coordinate (x,y) in FIG. 7C① is corrected to "74" as shown in FIG. 7C②. Pixel data conversion unit 2005 substitutes the corrected pixel value into the two functions shown in FIG. 3 using Equation (3), and outputs the calculated value which is closer to the corrected pixel value as the converted data (Step 2406 to Step 2408). As a result, the corrected pixel value "74" in FIG. 7C② is converted to "80" as shown in FIG. 7C③. Error calculation unit 2006 calculates the conversion error e on coordinate (x,y) using Equation (4) (Step 2409). Conversion error "−6" as shown in FIG. 7C③ is calculated from the corrected pixel value in FIG. 7C② and the converted pixel value in FIG. 7C③.

In the conversion in FIG. 7C, since converted value "80" is larger than corrected value "74" by 6, the conversion error is "−6". The conversion error is reflected in the correction of the gradation value of the pixel data corresponding to the next pixel to decrease the converted gradation value. By repeating such a process, the overall conversion error of an image is smaller in the error diffusion method than in other methods.

The error diffusion method, however, has two problems. One of the problems is the possibility that moire patterns appear in the converted image, since the method is so sensitive to an error diffusion coefficient, which is set to reflect the conversion errors, that the converted values show a cyclical change, depending on the error diffusion coefficient. This lowers image quality.

Proposed solutions to this problem are to use a stochastic process in the conversion process or to perform the correction by the stochastic process in the conversion process. Examples are a method of changing the direction of each conversion process randomly (Japanese Laid-Open Patent Application No. 5-37781), a method of changing the combination of the coefficients randomly (Gazou Denshi-Gakkai-Shi (a periodical for the Image Electronics Academy), Vol. 20, No. 5, 1997, pp443–449), and the method of preventing the appearance of moire patterns by adding random noise to some read-out image signals (Japanese Laid-Open Patent Application No. 7-288689).

The stochastic process means a discrete stochastic process. To use the stochastic process, or to perform the correction by the stochastic process in the conversion process means to reflect a random element in the converted value. The random element is reflected by adding a random amount of noise to the converted value or the pixel data before conversion, or by selecting one converted value from a plurality of converted value options at random, or the like.

The other problem of the error diffusion method is that fine lines in the processing direction in the original image may shift or may disappear in the converted image. An example is explained with reference to FIG. 8 showing a process where a line disappears in the error diffusion method. Suppose a pixel included in a line with width 1 and having an even number y-coordinate in the original image has a gradation value "9" and the conversion error values shown in FIG. 8①. The gradation values of the pixels included in the line are converted by the above-mentioned image processing device. The error diffusion coefficients shown in FIG. 7B are also used in the process. As the conversion process advances as shown in FIG. 8① to FIG. 8④, the gradation values of the pixels included in the line are converted to "0". As a result, the original gradation values are converted to "0", and the line disappears. When the line comprising the pixels having gradation value "9" is included in a character, the character is illegible in the converted image.

The gradation data of the pixels included in the disappeared line remains as error data, and has an adverse effect so that bright pixels are converted to extraordinarily bright ones. Consequently, the quality of the converted image is deteriorated. Such a line-disappearing phenomenon depends on the remained conversion errors as shown in FIG. 10, even if a Floyd-type filter factor shown in FIG. 9, which is generally available, is used. In the error diffusion method, the error diffusion coefficients to prevent such phenomenon cause another problem, an even strong moire pattern.

The problem, however, is avoidable by adding a relatively large amount of noise to the pixel data having low gradation value to disturb the cyclical change of the converted gradation values.

As an example of an image processing device using the method of adding noise or performing the correction by the stochastic process for the converted value, FIG. 11 shows a construction of the image processing device according to the description of Japanese Laid-Open Patent Application No. 7 288689. The image processing device shown in FIG. 11 has data conversion correction unit 3007 including weighting coefficient generation unit 3007a, random number generation unit 3007b, multiplication unit 3007c, and addition unit 3007d, in addition to the units included in the image processing device shown in FIG. 1.

The following is a brief explanation of data conversion correction unit 3007. Weighting coefficient generation unit 3007 generates the weighting coefficient defined according to the gradation value of the pixel data read out by pixel data read unit 3002. For instance, as shown in FIG. 12A, weighting coefficient generation unit 3007 generates a weighting coefficient so that the noise is highest for pixels with middle-level gradation values that often cause moire patterns. As shown in FIG. 12B and FIG. 12C, however, it is possible for weighting coefficient generation unit 3007 to output the same weighting coefficient for all the pixels. In FIG. 12A, FIG. 12B, and FIG. 12C, weighting coefficient h(I) represents the ratio of a random number to the step width of the two step functions, or (g(I)–f(I)).

Random number generation unit 3007b generates a random number. Multiplication unit 3007c multiplies the weighting coefficient generated by weighting coefficient generation unit 3007a and the random number generated by random number generation unit 3007b. Addition unit 3007d adds the value obtained from addition unit 3007c to the pixel data corrected by pixel data correction unit 3003. By those operations, noise dependent on the gradation value of the read-out pixel data is added to the pixel data corrected by pixel data correction unit 3003. As mentioned above, by adding a suitable amount of noise, the converted values are diffused stochastically, which help prevent the appearance of moire patterns and the shifting and disappearing of fine lines in the processing direction.

The operation of the image processing device and that of the above mentioned image processing device are almost the same. The image processing device scans the original image and converts the panel data as shown in FIG. 4. FIG. 13 and FIG. 14 show the flowcharts of this image processing device and correspond to FIG. 5 and FIG. 6. The differences between the flowcharts shown in FIGS. 13 and FIG. 5, or those shown in FIG. 14 and FIG. 6 are Step 3205 or Step 3305, where noise r is generated by weighting coefficient generation unit 3007a, random number generation unit 3007b, and addition unit 3007c, and Step 3206 or Step 3306, where noise r generated by addition unit 307d is added to the corrected pixel value. In these steps, the converted values are diffused by a suitable amount. In this specification, such an error diffusion method is called the noise-adding type error diffusion method.

It is necessary for the above-mentioned noise-adding type error diffusion method to add a large amount of noise to the pixel data having lower gradation value in order to prevent fine lines in the processing direction from shifting or disappearing. The addition of such a large amount of noise for the pixel data having lower gradation, however, causes another problem, the occurrence of roughness in the converted image, leading to lower quality of the converted image. On the other hand, the use of a smaller amount of noise, in order to reduce the degree of roughness in the converted image, increases the possibility of the disappearance of tine lines and the appearance of moire patterns. Therefore, it is almost impossible for the above-mentioned noise-adddihg type error diffusion system to convert an image, with less roughness, no moire pattern, and no shift or disappearance of fine lines in the processing direction in the converted image.

SUMMARY OF THE INVENTION

It is all object of the present invention to provide an image processing method and an image processing device performing a binarization conversion or a subtractive color conversion of high-quality multivalued images for solving the problems of moire patterns and disappearance of fine lines in the processing direction without producing a converted image that is overly rough.

The above-mentioned object is realized by performing the correction by the stochastic process in the conversion of the pixel data in case that the pixel corresponding to the pixel data satisfies a given condition, and by not performing the correction by the stochastic process in the conversion in case that the pixel does not satisfy the condition.

It is possible to perform the correction by the stochastic process in the conversion of the pixel data under the above-mentioned condition. The correction by the stochastic process is performed in the conversion of the pixel data that is likely to cause moire patterns or line disappearance, and the correction is not performed in the conversion of the other pixel data to reduce the degree of roughness in the converted image.

This method is effective in the conversion using the error diffusion method. The present invention improves the conversion precision of the whole image by reflecting the conversion errors in the conversion process by the error diffusion method, and effectively prevents causing moire patterns and line disappearance, which occur according to the error diffusion coefficients or the gradation pattern of the original image, with less roughness in the converted image.

The following is an explanation of how the correction by the stochastic process is performed in the conversion of the pixel data. The gradation value of the pixel data is converted by a plurality of functions, and converted value options are generated. In case that the pixel satisfies a given condition, one out of the converted value options is selected by the stochastic process as the converted value. In case that the pixel data does not satisfy the condition, the converted value option closest to the pre-converted gradation value is selected as the converted value.

The above-mentioned process achieves the object more easily than the process where the correction by the stochastic process is performed by adding noise to the gradation value of the pixel data, since no noise is generated and added in the above-mentioned process.

The above-mentioned condition may be set as the pixel is included in a predetermined region of the original images. Under the condition, the pixels, which are to be converted with the correction by the stochastic process, are designated by determining the region of the original image. Therefore, the disappearance of fine lines is prevented, by designating the region of the original image including the fine lines, with less roughness in the converted image.

The above-mentioned condition may be set as the value of the conversion errors or diffusion errors calculated by the error diffusion method are equal to or below a given value. Under the condition, the conversion errors are reflected properly in the converted value by the correction by the stochastic process in the conversion, when the value of the conversion errors around the pixel data is too small to be reflected in the converted value of the pixel data. The degree of roughness in the converted image is reduced, since no correction by the stochastic process is performed in the conversion when the value of the conversion errors around the pixel is large enough to be reflected in the converted value of the pixel data.

Under the condition, the above-mentioned value is calculated from the pixel data or one of the surrounding pixel data of the pixel corresponding to the pixel data by an operation expression. The threshold of the conversion errors and diffusion errors changes according to the circumstance of the pixel or its surrounding pixel. For instance, by using the operation expression having a large threshold for the region where the gradation value changes drastically, a large threshold is used for the region having a line. Consequently, the correction by the stochastic process is performed in the conversion to prevent the line from disappearing. On the other hand, since a small threshold is used for the region where the gradation value changes gradually, no correction by the stochastic process is performed in the conversion in order to reduce the degree of roughness in the converted image.

BRIEF DESCRIPTION OF THE DRAWINGS

These and other objects, advantages and features of the invention will become apparent from the following description thereof taken in conjunction with the accompanying drawings which illustrate specific embodiment of the invention. In the drawings:

FIG. 7A is an example of the processing direction of the conversion process according to the error diffusion method;

FIG. 7B is an example of the diffusion coefficient;

FIG. 7C shows how the gradation of an original image and the conversion error change in the conversion process of the error diffusion method;

FIG. 11 is a block diagram illustrating the construction of the image processing device according to the conventional noise adding type error diffusion method;

FIG. 17A is an example of designating a region of the image designated by the region designation unit according to the first embodiment;

FIG. 17B is an example of the data stored in the region designation unit;

Figure 30:
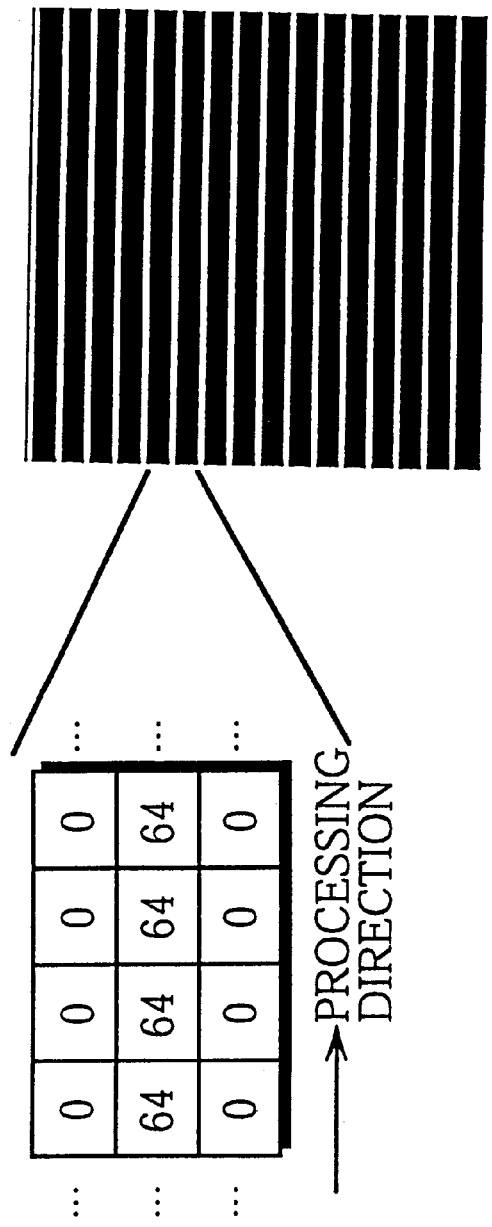
FIG. 30 is the distribution of the gradation value of an original image with 16 lines that is used in the experimentation in the embodiments.
Figure 31A:
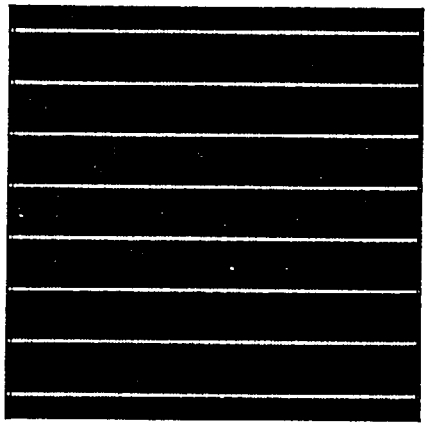
FIG. 31A is the result of the conversion of the original image having the gradation value distribution shown in FIG. 30 using the image processing device according to the conventional error diffusion method.
Figure 31B:
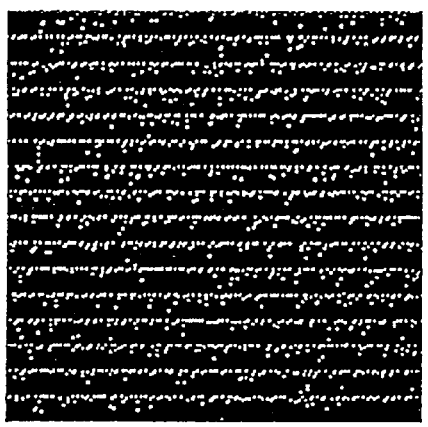
FIG. 31B is the result of the conversion of the original image having the gradation value distribution shown in FIG.
Figure 31C:
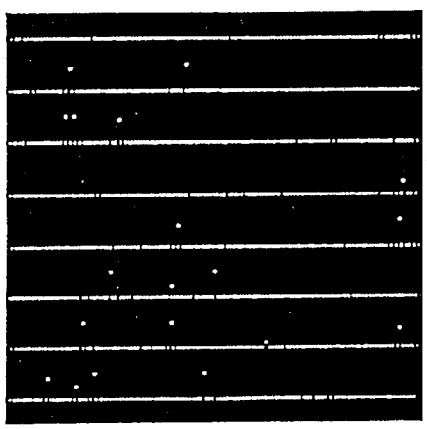
Figure 32A:
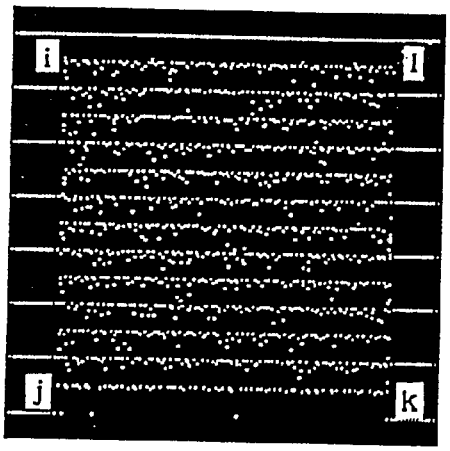
Figure 32B:
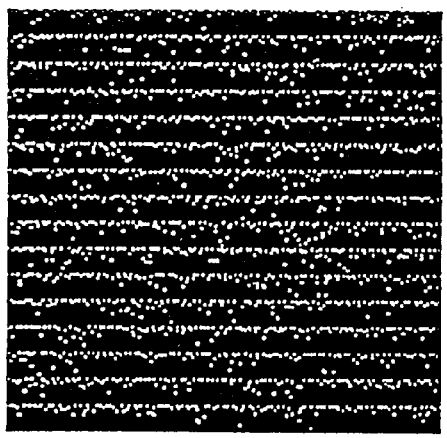
Figure 32C:
Figure 33A:
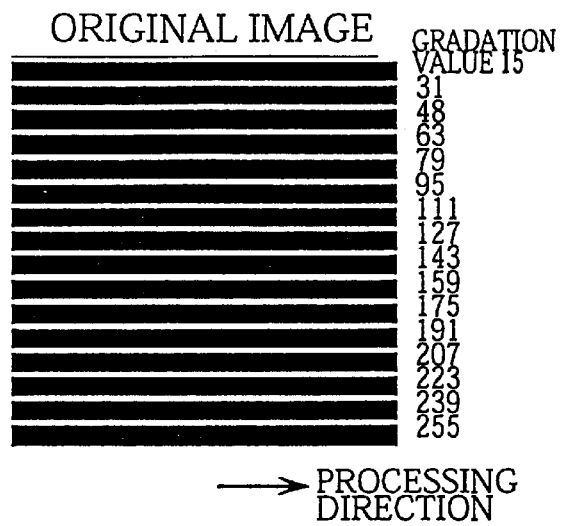
Figure 33B:
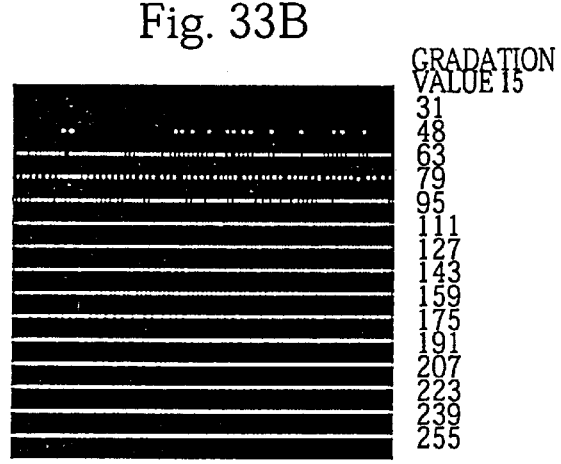
Figure 33C:
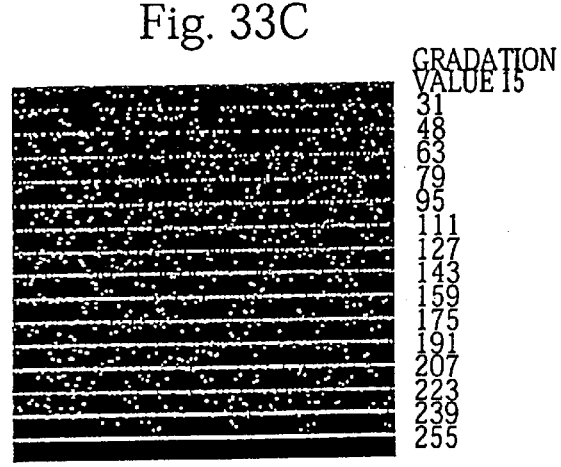

30 using the image processing device according to the conventional noise-adding type error diffusion method set to add 10% noise to the pixel data;

FIG. 31C is the result of the conversion of the original image having the gradation value distribution shown in FIG. 30 using the image processing device according to the conventional noise-adding type error diffusion method set to add 100% noise to the pixel data;

FIG. 32A is the result of the conversion of the original image having the gradation value distribution shown in FIG. 30 using the image processing device according to the first embodiment;

FIG. 32B is the result of the conversion of the original image having the gradation value distribution shown in FIG. 30 using the image processing device according to the second embodiment;

FIG. 32C is the result of the conversion of the original image having the gradation value distribution shown in FIG. 30 using the image processing device according to the third embodiment;

FIG. 33A is the distribution of the gradation value of an original image having horizontal lines of different gradation value used in the experimentation in the embodiment;

FIG. 33B is the result of the conversion of the original image having the gradation value distribution shown in FIG. 33A using the image processing device according to the conventional noise-adding type error diffusion method set to add 10% noise to the pixel data; and FIG. 33C is the result of the conversion of the original image having the gradation value distribution shown in FIG. 33A using the image processing device according to the third embodiment.

DESCRIPTION OF THE PREFERRED EMBODIMENTS

The following is an explanation of the preferred embodiment of the present invention with reference to the figures.

First Embodiment

Figure 15:
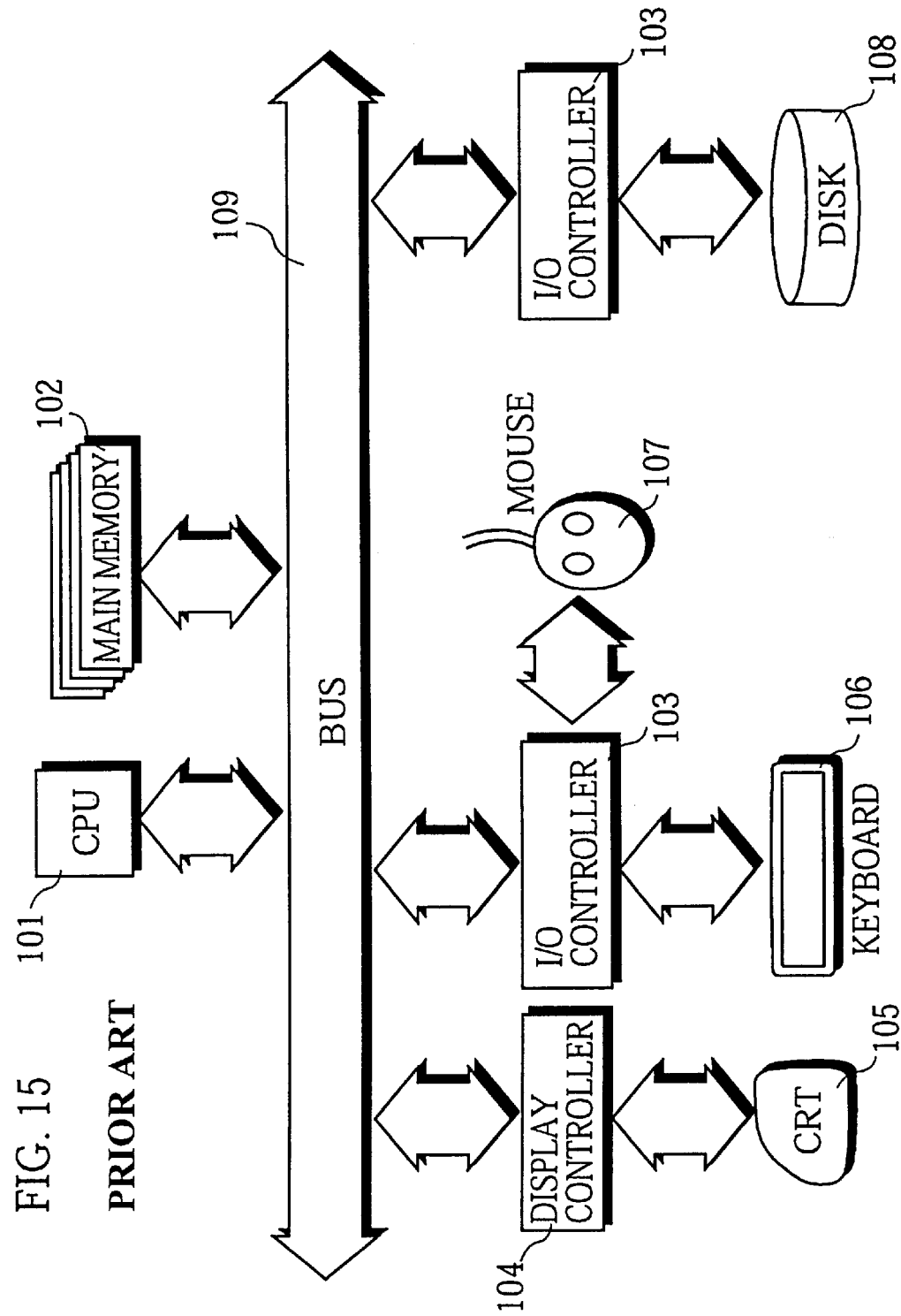
FIG. 15 is a hardware construction of the image processing device according to the first embodiment.

FIG. 15 is the hardware construction of the image processing device of the present invention. The image processing device shown in FIG. 15 includes CPU 101 performing operations, main memory 102 as the work area of CPU 101, disk 108 storing the data of the original image and that of the converted image, CRT 105 displaying the image, keyboard 106 and mouse 107 for inputting instructions from users, bus 109 connecting each of the units, I/O controller 103 transferring data between bus 109 and keyboard 106 or the like, and display controller 104 transferring data between CRT 101 and bus 109. The image processing device according to the later embodiments has the same hardware construction.

Figure 16:
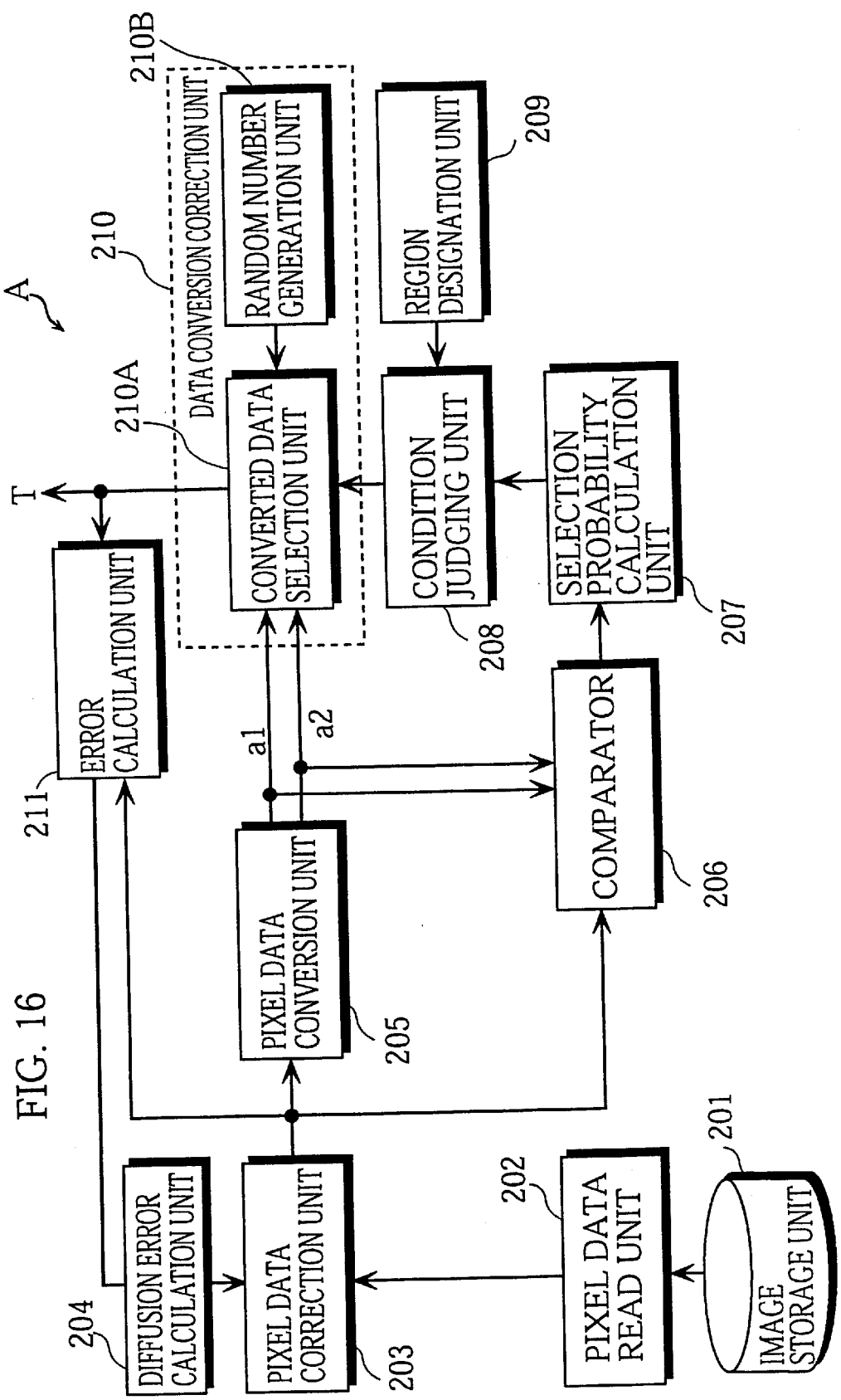
FIG. 16 is a block diagram of the image processing device according to the first embodiment.

FIG. 16 is a block diagram of the image processing device according to the present embodiment. The image processing device includes image storage unit 201, pixel data read unit 202, pixel data correction unit 203, diffusion error calculation unit 204, pixel data conversion unit 205, comparator 206, selection probability calculation unit 207, condition judging unit 208, region designation unit 209, data conversion correction unit 210 including converted data selection unit 210A and random number generation unit 210B, and error calculation unit 211.

Figure 1:
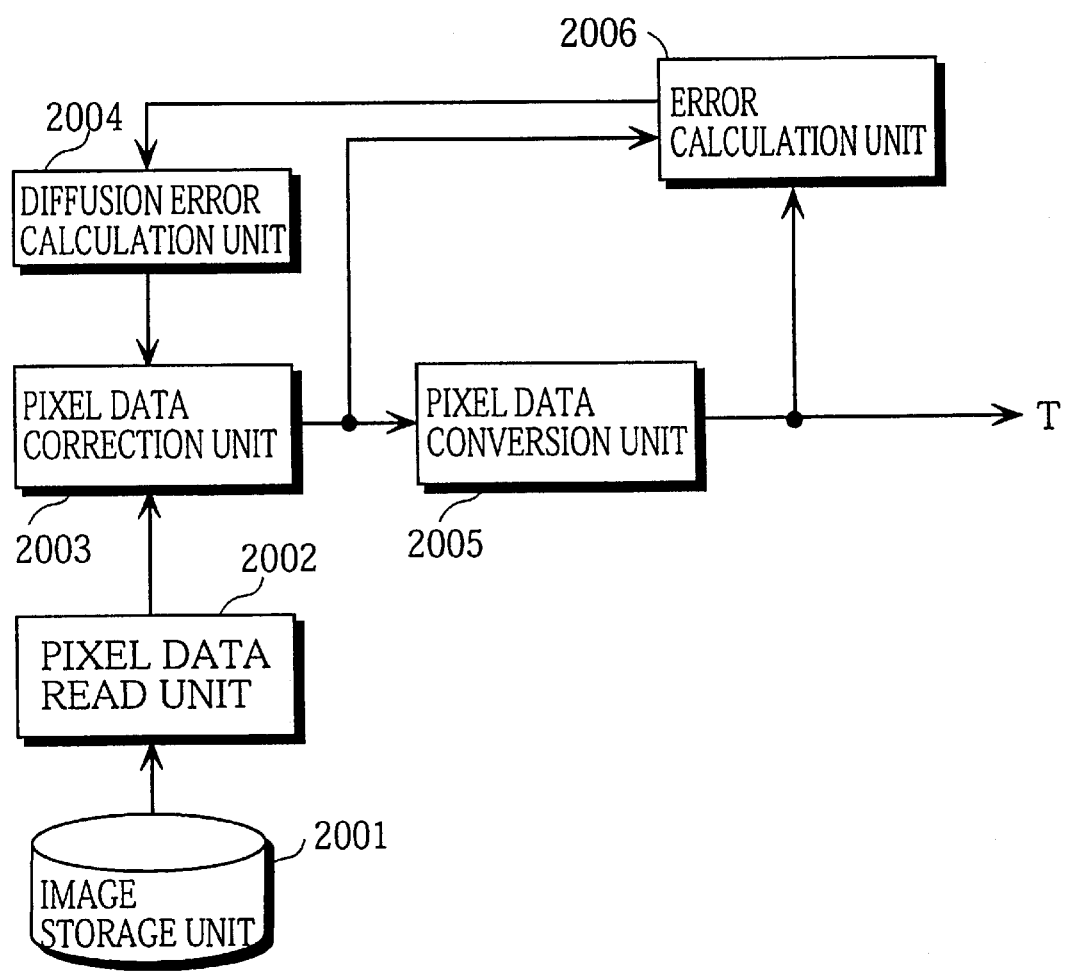
FIG. 1 is a block diagram illustrating the construction of the image processing device according to the conventional error diffusion method.
Figure 2:
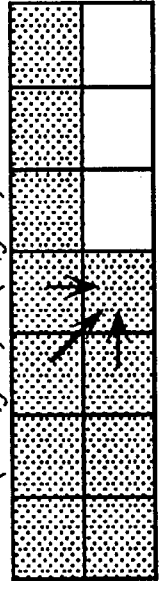
FIG. 2 is an example of the diffusion coefficient used in the error diffusion method and the process according to the error diffusion coefficient.

Image storage unit 201, pixel data read unit 202, pixel data correction unit 203, diffusion error calculation unit 204, and error calculation unit 211 of the present image processing device shown in FIG. 16 are the same as the corresponding units of the conventional image processing device shown in FIG. 1. Pixel data read unit 202 reads out the pixel data stored in image storage unit 201, and outputs the data to pixel data correction unit 203. Diffusion error calculation unit 204 calculates the diffusion error E from the conversion errors e output by error calculation unit 211, and transfers it to pixel data correction unit 203. Pixel data correction unit 203 adds the diffusion error E calculated by diffusion error calculation unit 204 to the pixel data output by pixel data read unit 202, and corrects the gradation value of the pixel data.

Figures 3A, 3B:
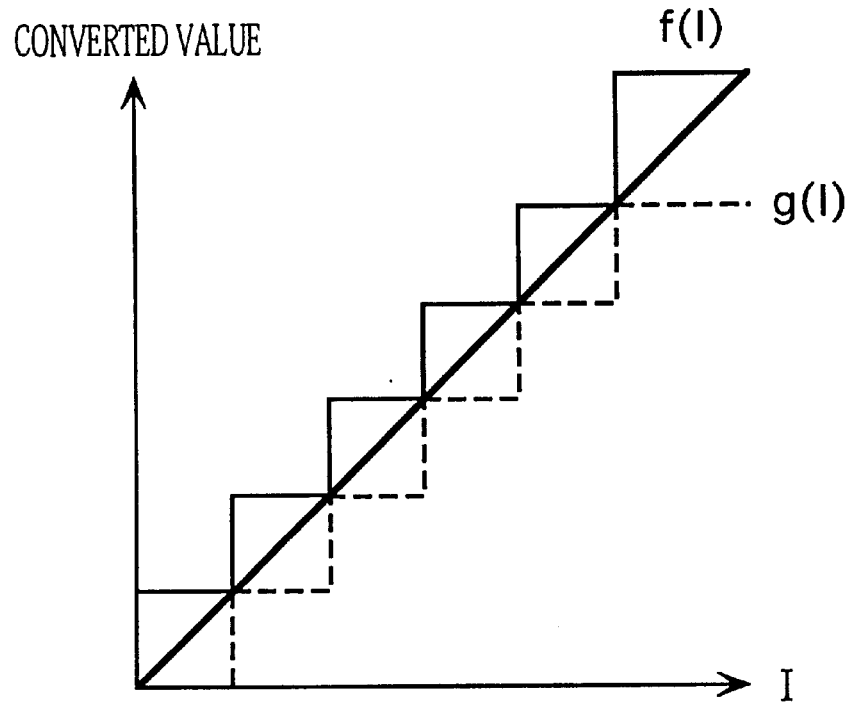
FIG. 3A is a table of the value for the ranges of the two functions included in the step functions for the subtractive color conversion.
FIG. 3B shows step functions for subtractive color convertion.

Pixel data conversion unit 205 converts the gradation value z' of the pixel data, corrected by pixel data correction unit 203, using the two or more functions, and outputs a converted data option for each converted value. In the present embodiment, pixel data expressed with 256-level gradation are converted to data expressed with seven-level gradation. Functions g(I) and f(I) shown in FIGS. 3A and 3B are used.

Comparator 206 calculates the difference between the two converted data options output by pixel data conversion unit 205, and the difference between the gradation value of the pixel data output by pixel data correction unit 203 and the smaller of the two converted data options. Selection probability calculation unit 207 calculates selection probability Δz of the converted value using the following Equation (5).

$$\Delta z = \frac{(z' - f(z'))}{(g(z') - f(z'))} \quad \text{Equation (5)}$$

Selection probability Δz represents the probability that converted value g(z') is selected.

Region designation unit 209 designates the region of the original image indicated by users of the image processing device in advance. In the present embodiment, region designation unit 209 designates the square region of the original image shown in FIG. 17A, where line disappearing causes illegible characters, using the coordinate value in the upper left hand corner of the square, (x0,y0) and its bottom right hand corner, (x1,y1), and stores the coordinate values as shown in FIG. 17B. Region designation unit 209 designates the area according to the data provided by the user or from an outside storage medium.

Condition judging unit 208 decides whether a pixel of the original image satisfies a predetermined condition. In the present embodiment, condition judging unit 208 decides whether the pixel is included in the region stored in region designation unit 209. In case that condition judging unit 208 decides that the above-mentioned condition is not satisfied, condition judging unit 208 substitutes "1.0" into the above-mentioned Δz when Δz is larger than 0.5, and substitutes "0" into Δz when Δz is equal to or smaller than 0.5.

Data conversion correction unit 210 additionally performs correction by a stochastic process in the conversion by data conversion unit 205 in case that condition judging unit 208 decides the condition is satisfied. Data conversion correction unit 210 includes converted data selection unit 210A and random number generation unit 210B. Random number generation unit 210B generates random number r, more specifically, in the present embodiment, a uniform random number, [0, 1). The explanation of how to arithmetically generate a uniform random number is omitted in the present embodiment, since it is not the substance of the present invention. In case that condition judging unit 208 decides the condition is satisfied, converted data selection unit 210A selects and outputs one of the above-mentioned two converted data options based on the random number generated by random number generation unit 210B as converted data. In case that condition judging unit 208 decides the condition is not satisfied, converted data selection unit 210A selects and outputs the closer of the above-mentioned two converted data options to the converted gradation value of the pixel data as converted data.

Specifically, converted data selection unit 210A compares the random number r generated by random number generation unit 210B with selection probability $\Delta z$ of converted value g(z'), and outputs g(z') when $\Delta z$ is equal to or larger than g(z'), and outputs f(z') when $\Delta z$ is smaller than g(z').

In case that condition judging unit 209 decides the condition is satisfied, g(z') is selected with selection probability $\Delta z$, and f(z') is selected with selection probability 1-$\Delta z$.

The following describes the possess in case that condition judging unit 208 decides the condition is not satisfied. When $\Delta z$ is larger than 0.5, that is to say converted value g(z') is closer to the output value of pixel data correction unit 203, converted value g(z') is output since $\Delta z$ is "1.0" and is larger than every random number r. On the other hand, when $\Delta z$ is equal to or smaller than 0.5, that is to say converted value f(z') is closer to the output value of pixel data correction unit 203, converted value f(z') is output since $\Delta z$ is "0" and is smaller than every random number r.

The following is an explanation of the operation of the image processing device having the above-mentioned structure.

The process of the image processing device and that of the image processing device shown in FIG. 1 are almost the same. The overall operation is the same as explained for the flowchart shown in FIG. 4. The initial value of each conversion error is set at 0, and the coordinate value in the y-axis as the first scanning point is set at 0 (Step 2301 and Step 2302). While the image is being scanned with the positive direction of the y-axis as the sub scanning direction and the x-axis as the main scanning direction, with the scanning direction being positive with regard to the x-axis when y is equal to 0 or an even number and negative when y is equal to an odd number, pixel data read unit 202 reads out pixel data, and pixel conversion unit 205 converts the pixel data, until the coordinate value in the y-axis reaches the top of the image (Step 2303 to Step 2307).

Figure 4:
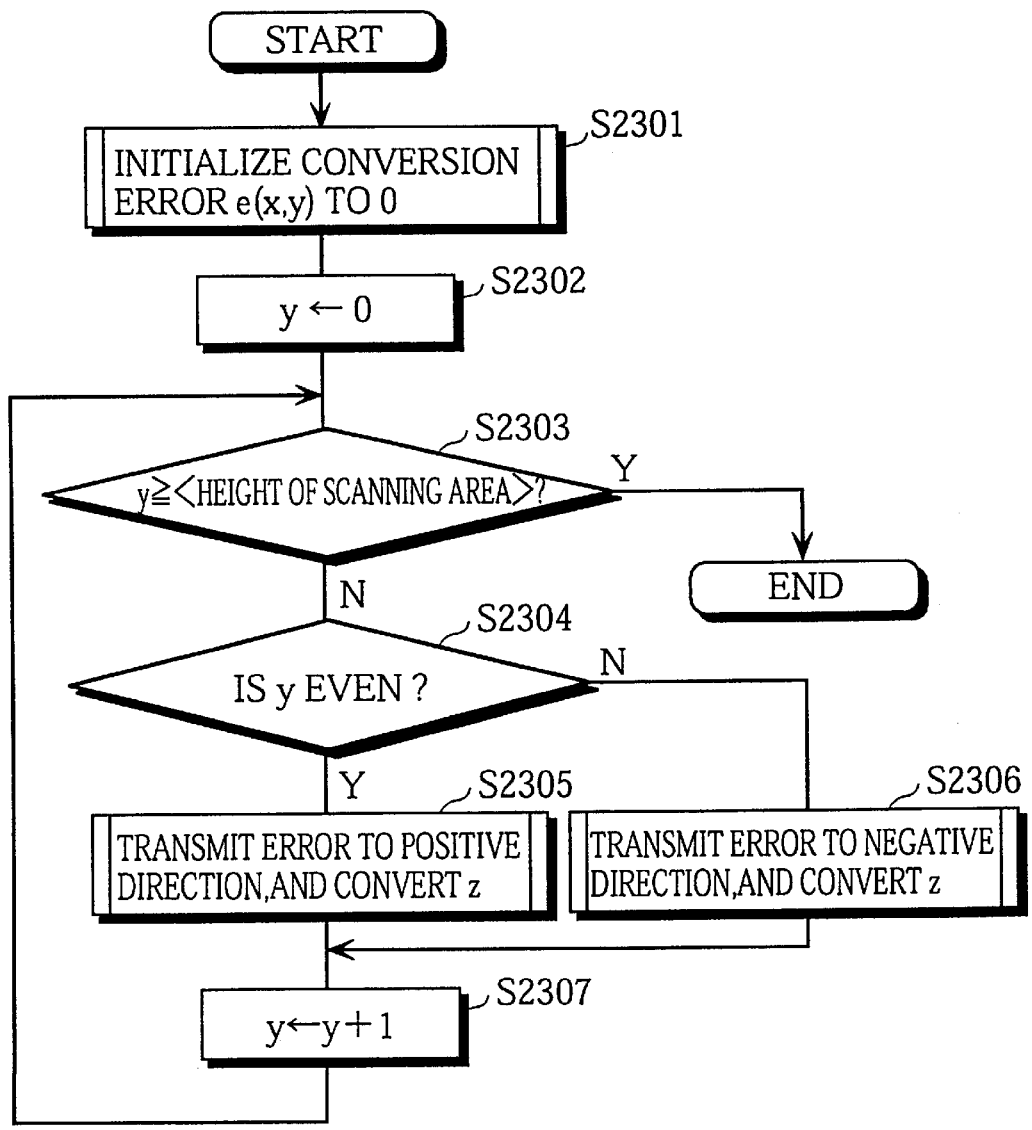
FIG. 4 is a flowchart illustrating the operation of the general error diffusion method.
Figure 5:
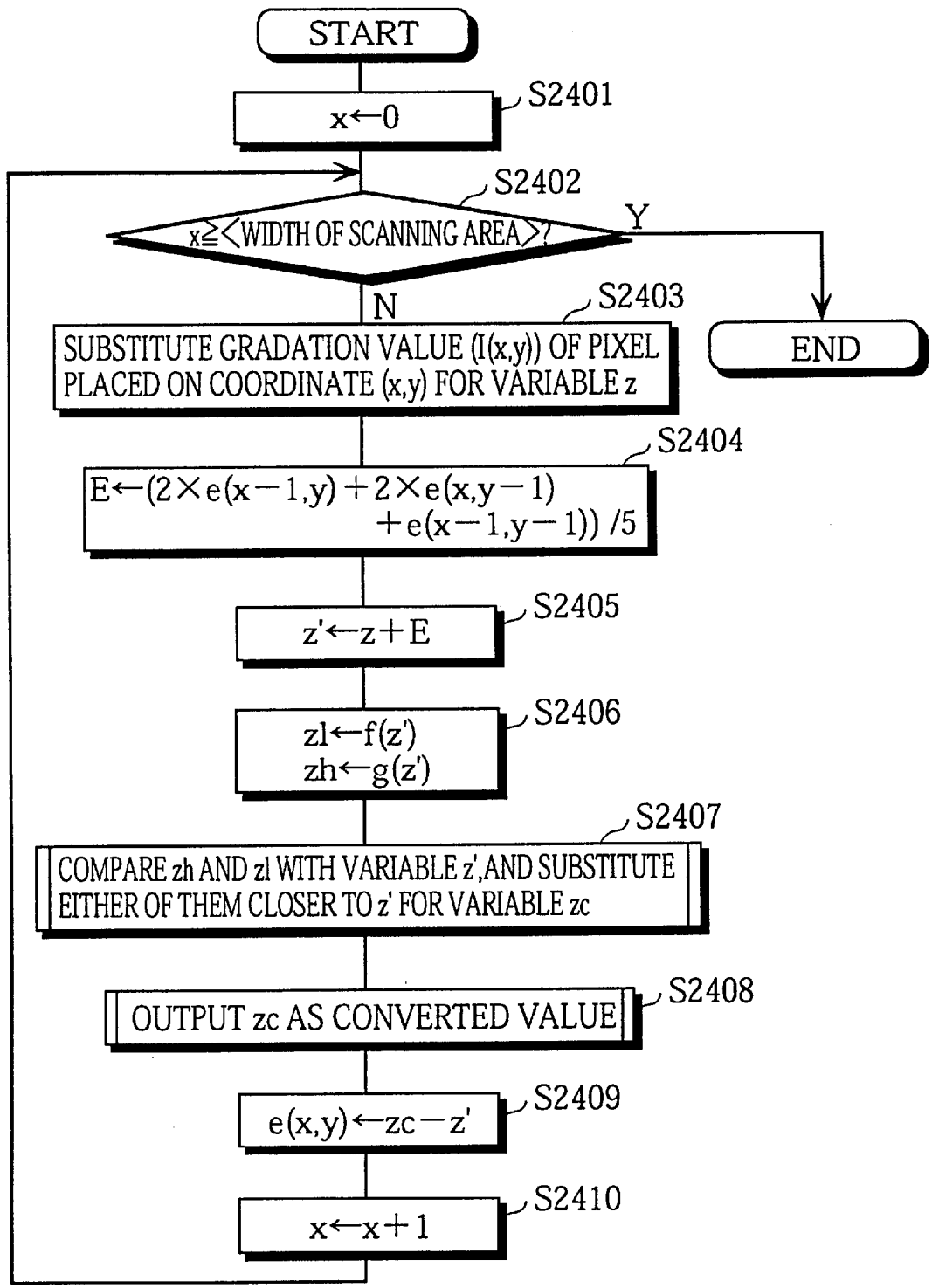
FIG. 5 is a flowchart illustrating the operation of the conversion process in the positive direction or the x-axis of the image processing device according to the conventional error diffusion method.
Figure 6:
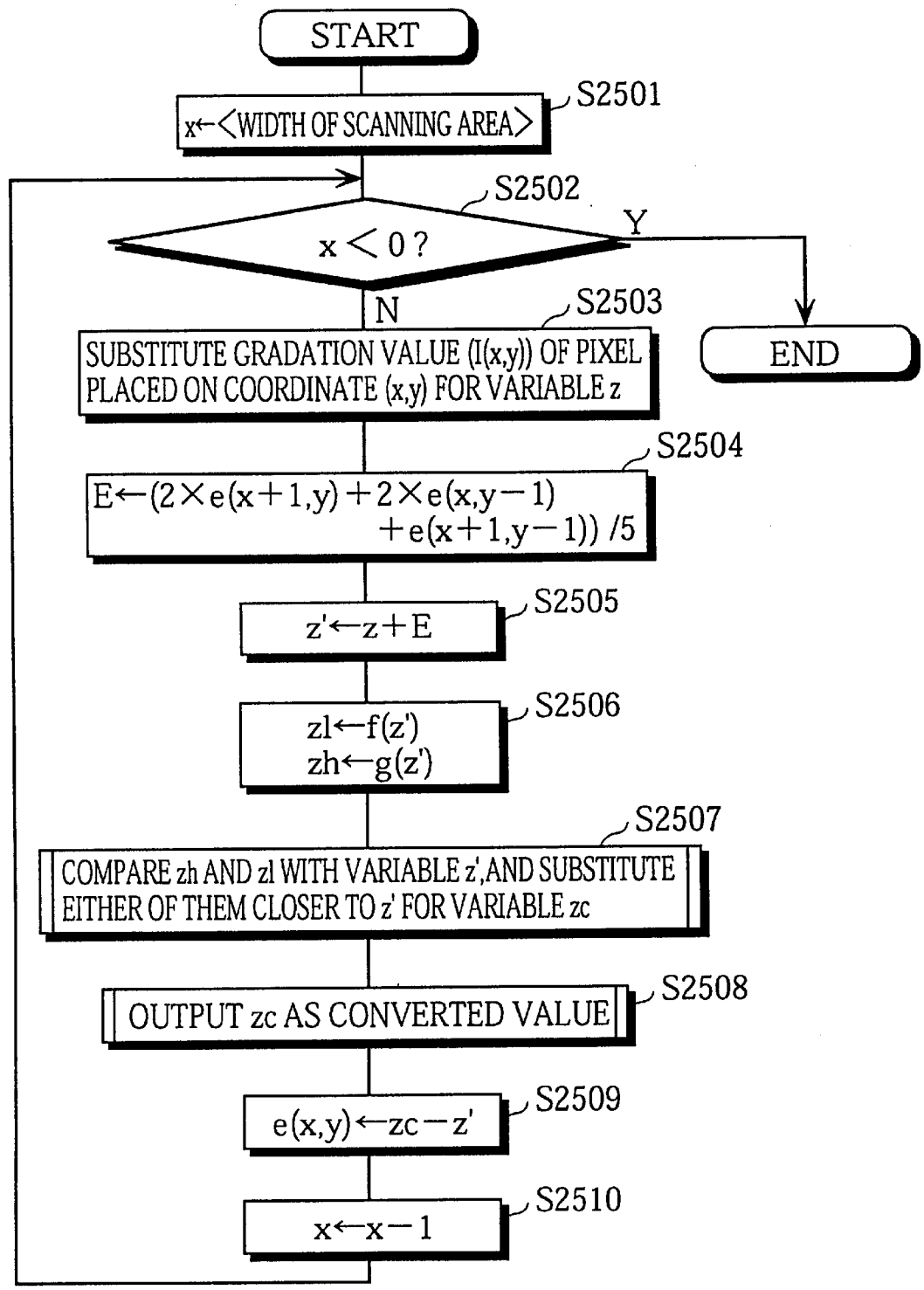
FIG. 6 is a flowchart illustrating the operation of the conversion process in the negative direction of the x-axis of the image processing device according to the conventional error diffusion method.
Figure 18:
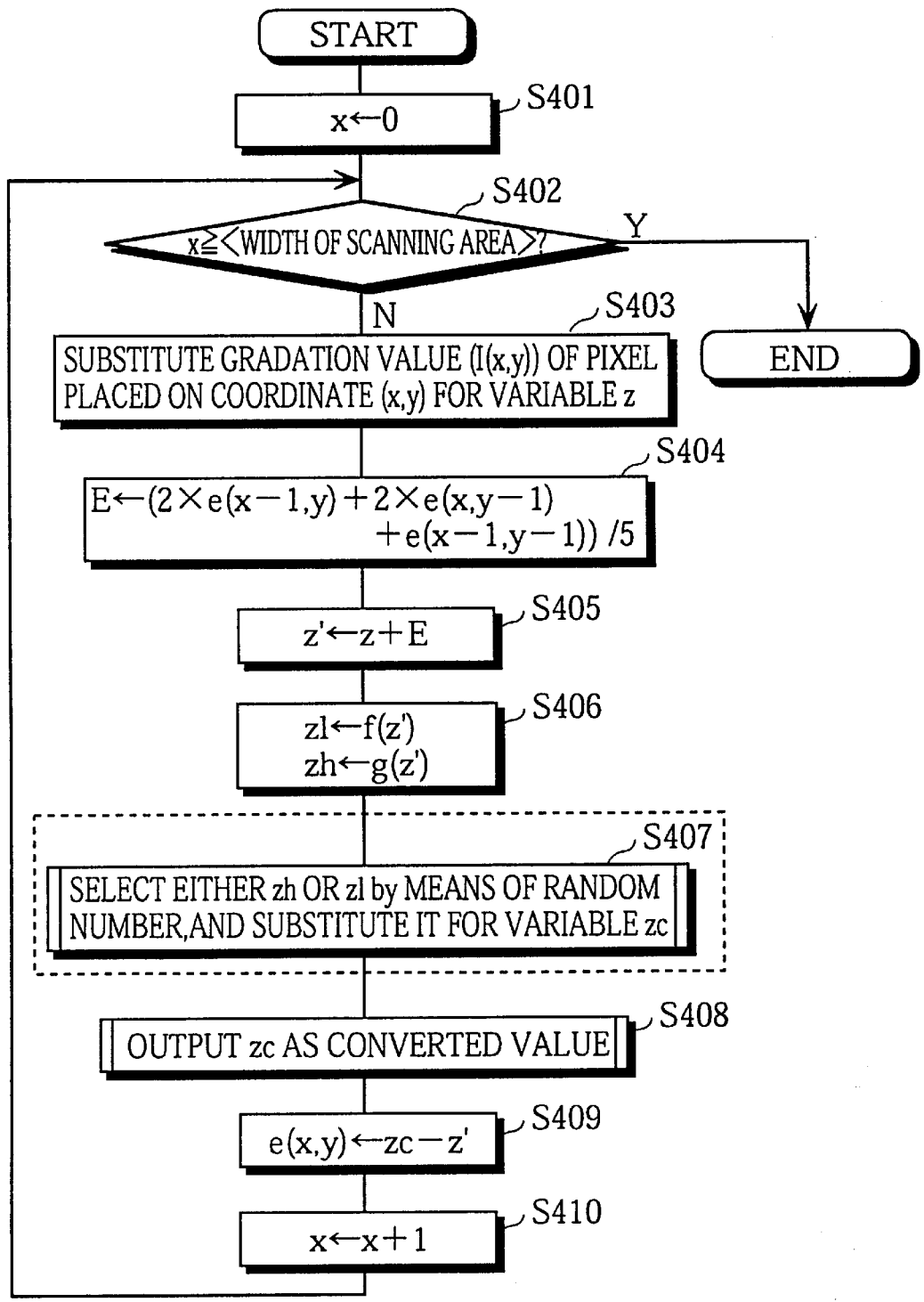
FIG. 18 is a flowchart illustrating the operation of the conversion process in the positive direction of the x-axis of the image processing device according to the first embodiment.
Figure 19:
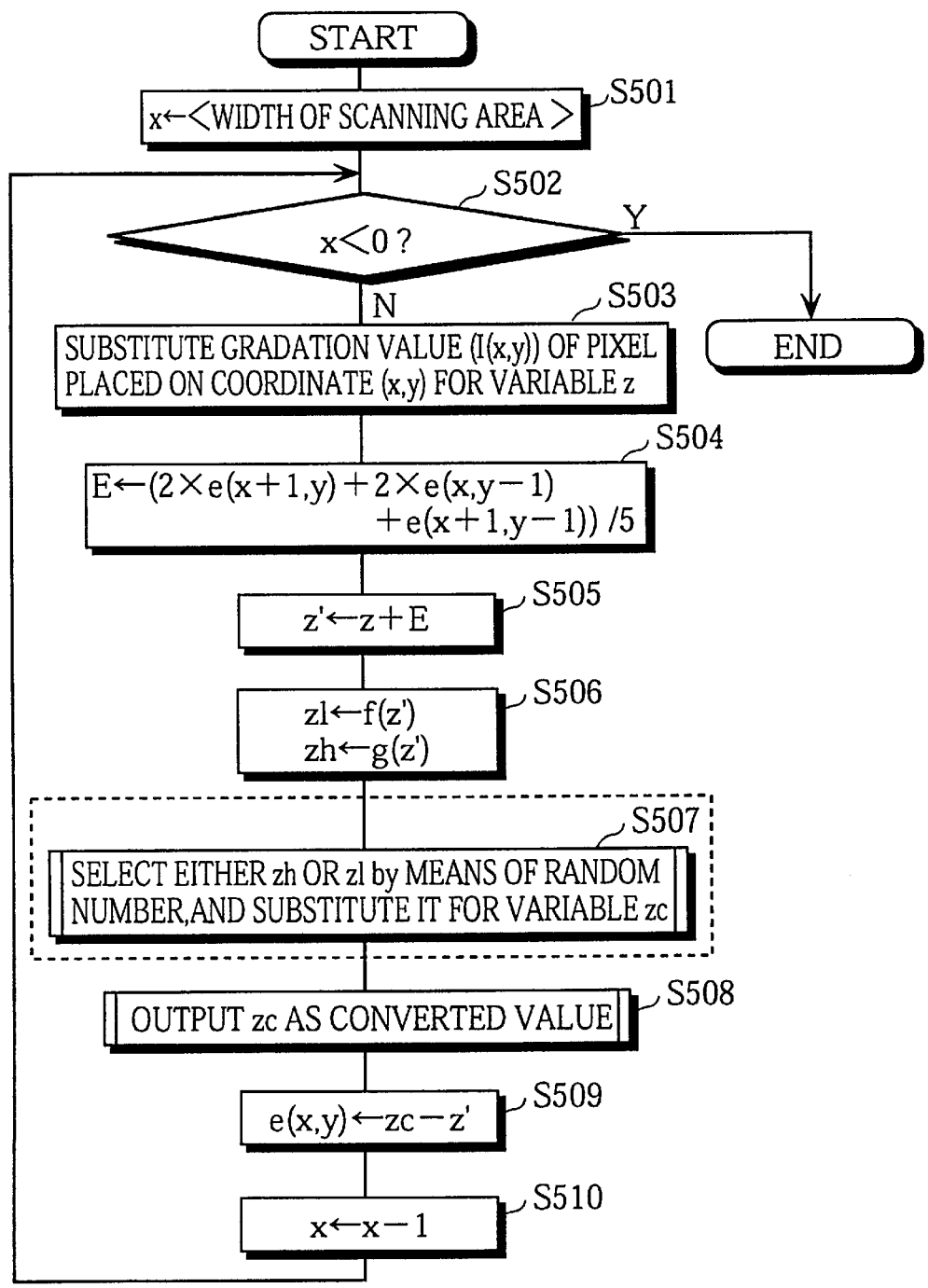
FIG. 19 is a flowchart illustrating the operation of the conversion process in the negative direction of the x-axis of the image processing device according to the first embodiment.
Figure 20:
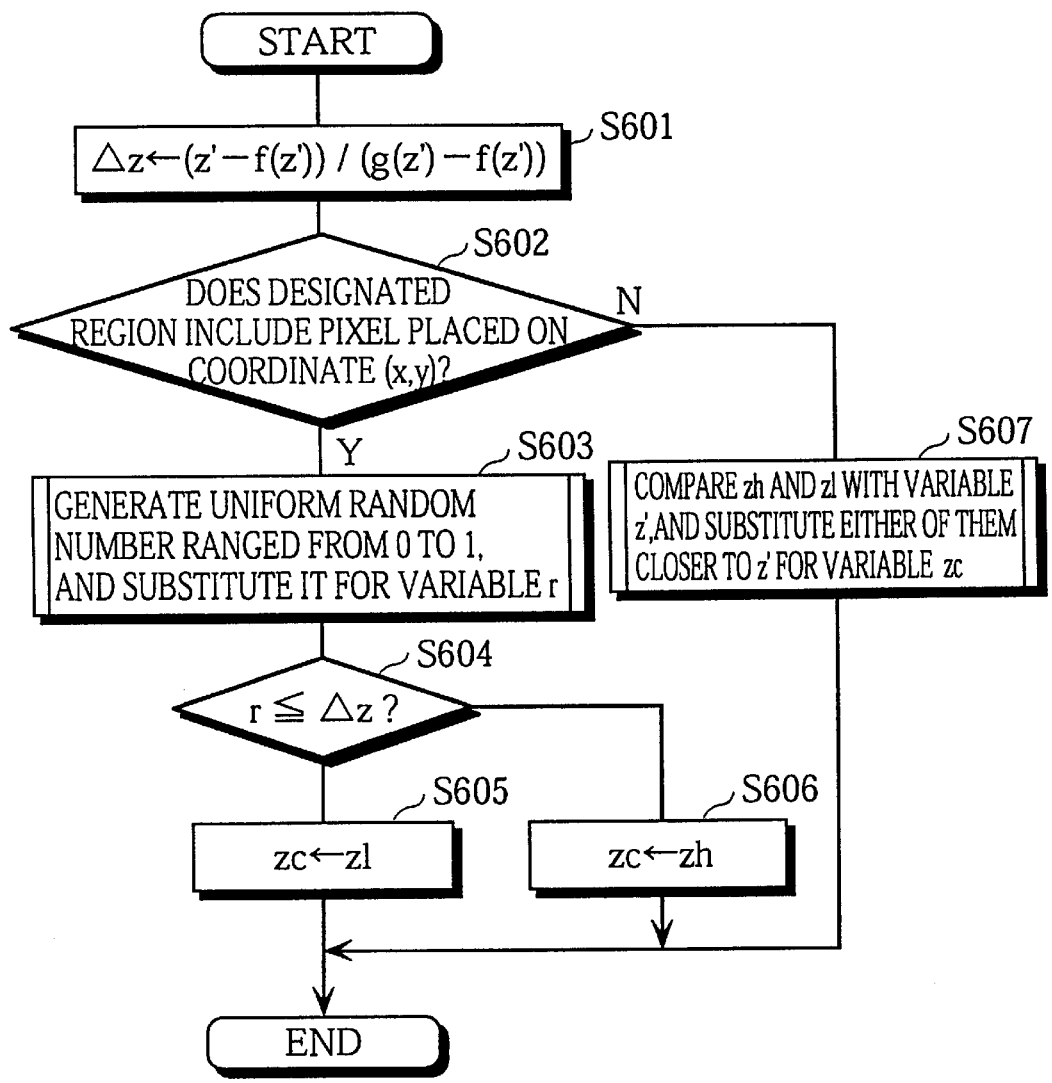
FIG. 20 is a flowchart illustrating how to select the converted value according to the first embodiment.

FIG. 18 and FIG. 19 are flowcharts explaining the operation of the image processing device according to the present embodiment corresponding to the operation Step 2304 to Step 2307 in the flowchart shown in FIG. 4. The flowcharts in FIG. 18 and FIG. 19 differ from those in FIG. 5 and FIG. 6 in that condition judging unit 208 and data conversion correction unit 210 select one of the two converted values using a random number (Step 407 or Step 507). FIG. 20 is a detailed explanation of Step 407 in FIG. 18 or Step 507 in FIG. 19 using a flowchart.

The process in the flowcharts shown in FIG. 18 and FIG. 19 are almost the same, so that the process of the image processing device will only be explained using the flowchart shown in FIG. 18. The flowchart shown in FIG. 18 explains the operation in case that the image is scanned in the positive direction of the x-axis. The coordinate value in the x-axis of the initial scanning point is set at 0 (Step 407). While the image is scanned in one direction of the x-axis, the following process is performed (Step 402 to step 410). Pixel data read unit 202 reads out two-dimensional array pixel data stored in image storage unit 201, and transfers it to pixel data correction unit 203. Pixel data correction unit 203 substitutes the gradation value T(x,y) of the pixel at coordinate (x,y) into the variable z (Step 403). Diffusion error calculation unit 204 calculates the diffusion error E from the error conversion value calculated by error calculation unit 211 using Equation (2), and outputs it to pixel data correction unit 203 (Step 404). Pixel data correction unit 203 calculates the corrected value z' of the gradation value I(x,y) substituted into the variable z by adding the diffusion error E to the variable z (Step 405).

Pixel data conversion unit 205 calculates f(z') and g(z') using conversion functions shown in FIG. 3A and FIG. 3B, and outputs them to data conversion correction unit 210 through signal lines a1 and a2 (Step 406). Data conversion correction unit 210 selects f(z') or g(z') using a random number (Step 407). A detailed explanation of the process of Step 407 is given later. Data conversion correction unit 210 outputs the converted value zc, the converted data selected in Step 407, to terminal T (step 408). Error calculation unit 211 calculates the conversion error e(x,y), the difference between the converted value zc and corrected value z' output by pixel data correction unit 203.

The following is a detailed explanation of the operation of Step 407 with reference to FIG. 20. FIG. 20 is a flowchart explaining the operation of Step 407 in the flowchart shown in FIG. 18 or Step 507 in the flowchart shown in FIG. 19. Comparator 206 calculates "z'-f(z')" and "g(z')-f(z')" from converted values f(z') and g(z') calculated by pixel data conversion unit 205, and corrected value z' output from pixel data correction unit 203. Selection probability calculation unit 207 calculates selection probability $\Delta z$ using Equation (5) (Step 601). Condition judging unit 208 decides whether the pixel is included in the region designated by region designation unit 209, or the region shown in FIG. 17A in the present embodiment (Step 602). In case that condition judging unit 208 decides the condition is satisfied, converted data selection unit 210A in data conversion correction unit 210 compares the uniform random number r generated by random number generation unit 210B with the above-mentioned selection probability $\Delta z$, and outputs f(z') as the converted value zc to terminal T when selection probability $\Delta z$ is equal to or smaller than the random number r, and outputs g(z') as the converted value zc to terminal T when selection probability $\Delta z$ is larger than the random number r (Step 604 to Step 606). On the other hand, when condition judging unit 200 decides the condition is not satisfied in Step 602, as a result of the above-mentioned process, the closer of converted values f(z') and g(z') to the corrected pixel data z' is output as the converted value zc (Step 607). In this case, the obtained converted value is the same as that in the conventional error diffusion method.

Figure 8:
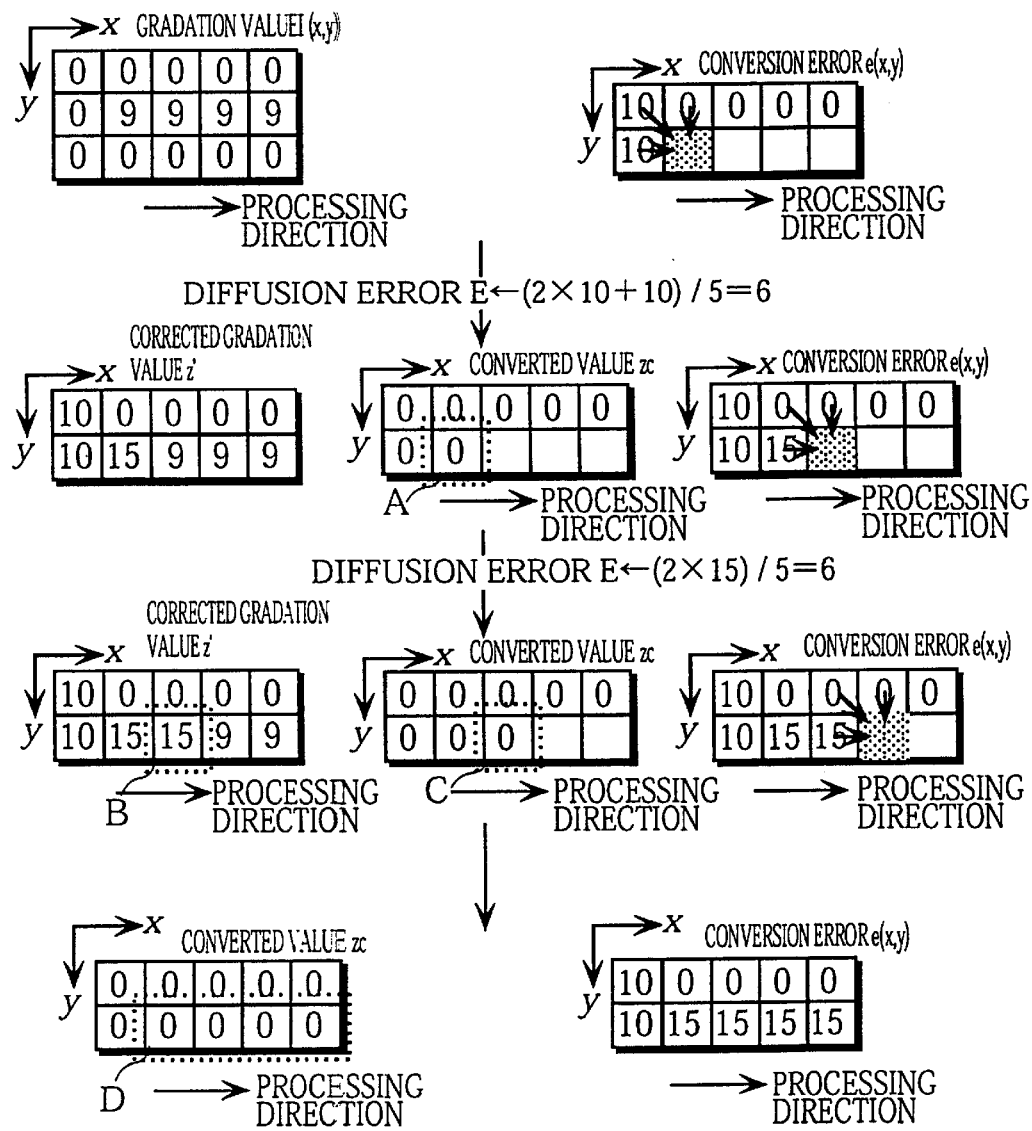
FIG. 8 is an explanation of the process illustrating how a line in the processing direction disappears.
Figures 9, 10:
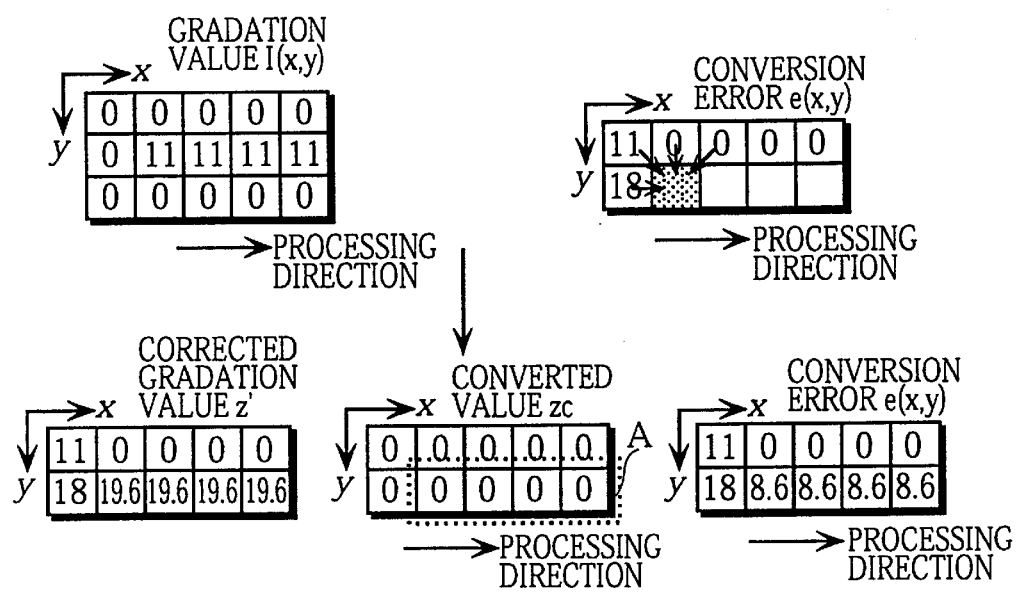
FIG. 9 is a Floyd-type diffusion coefficient.
FIG. 10 is an explanation of the process illustrating how a line in the processing direction disappears when the Floyd-type diffusion coefficient is used in the process according to the error diffusion method.

By the image processing device and the image processing method conducting the above-mentioned operation according to the present embodiment, the converted gradation value is stochastically converged, even if a random number is used, due to the way selection probability $\Delta z$ is set by selection probability calculation unit 207 and the nature of random numbers. For instance, in case that the pixel having the gradation value shown in FIG. 8① is included in the designated region, the converted value 40, the larger converted value calculated using the conversion functions shown in FIG. 3A, is selected with probability greater than 0 probability, when the corrected gradation value is 15 as shown in FIG. 8②. In other words, since Equation (5) calculated in Step 601 in the flowchart shown in FIG. 20 and a random number is uniformly generated, g(z') (the larger converted value)=40 is selected as the converted value with $\Delta z$, (15−0)/(40−0)=0.375, probability. When the three consecutive pixels have corrected value 15, the probability that the gradation value of every pixel is converted to 0 is calculated by Equation (6), $$\frac{(8-3)}{8} \times \frac{(8-3)}{8} \times \frac{(8-3)}{8} = 0.244 \qquad \text{Equation (6)}$$

and the probability that the gradation value of every pixel is converted to 40 is calculated by Equation (7).

$$1-0.244=0.76 \qquad \text{Equation (7)}$$

Therefore, the error diffusion method of the present invention is improved compared to the conventional one. The effect of the random number only on the designated region reduces the degree of roughness in the not-designated region in the converted image compared to the noise-adding type error diffusion method, since condition judging unit 208 and region designation unit 209 designate the region where the correction by the stochastic process is performed in the conversion of the gradation value of the pixel.

As mentioned above, the method according to the first embodiment solves the problem of the disappearance of fine lines with reducing the degree of roughness in the whole converted image.

The above-mentioned image processing device can be realized by storing the program, which is executed by the computer achieved by the above-mentioned construction and process, in a conventional computer. The program is stored on a record medium, such as a floppy disk, readable by the above-mentioned computer. The same is applied to the following embodiments.

Second Embodiment

The following is an explanation of the second embodiment of the present invention with reference to figures.

Figure 21:
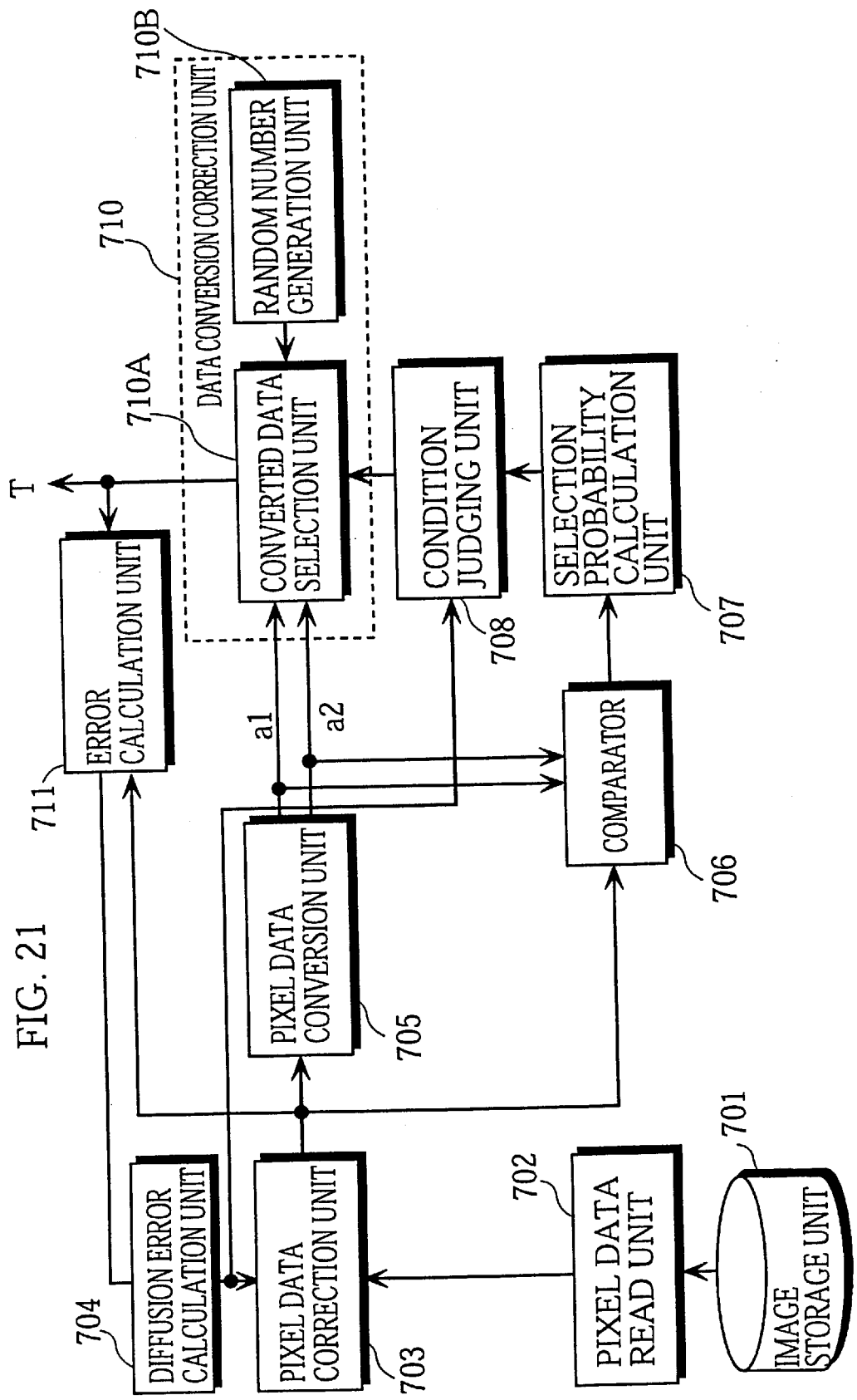
FIG. 21 is a block diagram illustrating the construction of the image processing device according to the second embodiment.

FIG. 21 is a block diagram of the image processing device according to the present embodiment. The image processing device differs from that of the first embodiment at the following points: the image processing device does not include region designation unit 209; the construction of condition judging unit 708 differs from the corresponding unit in the first embodiment; and conditions judging unit 708 uses the value output by diffusion error calculation unit 704.

Condition judging unit 708 of the image processing device is set to decide whether the diffusion error E for the pixel calculated by diffusion error calculation unit 704 is equal to or smaller than value $E_{max}$. $E_{max}$ is set at optimal values that can be found by experimentation or the like. $E_{max}=(g(T)-f(I))/3=40/3=13.3$ is used in the present embodiment.

Figure 22:
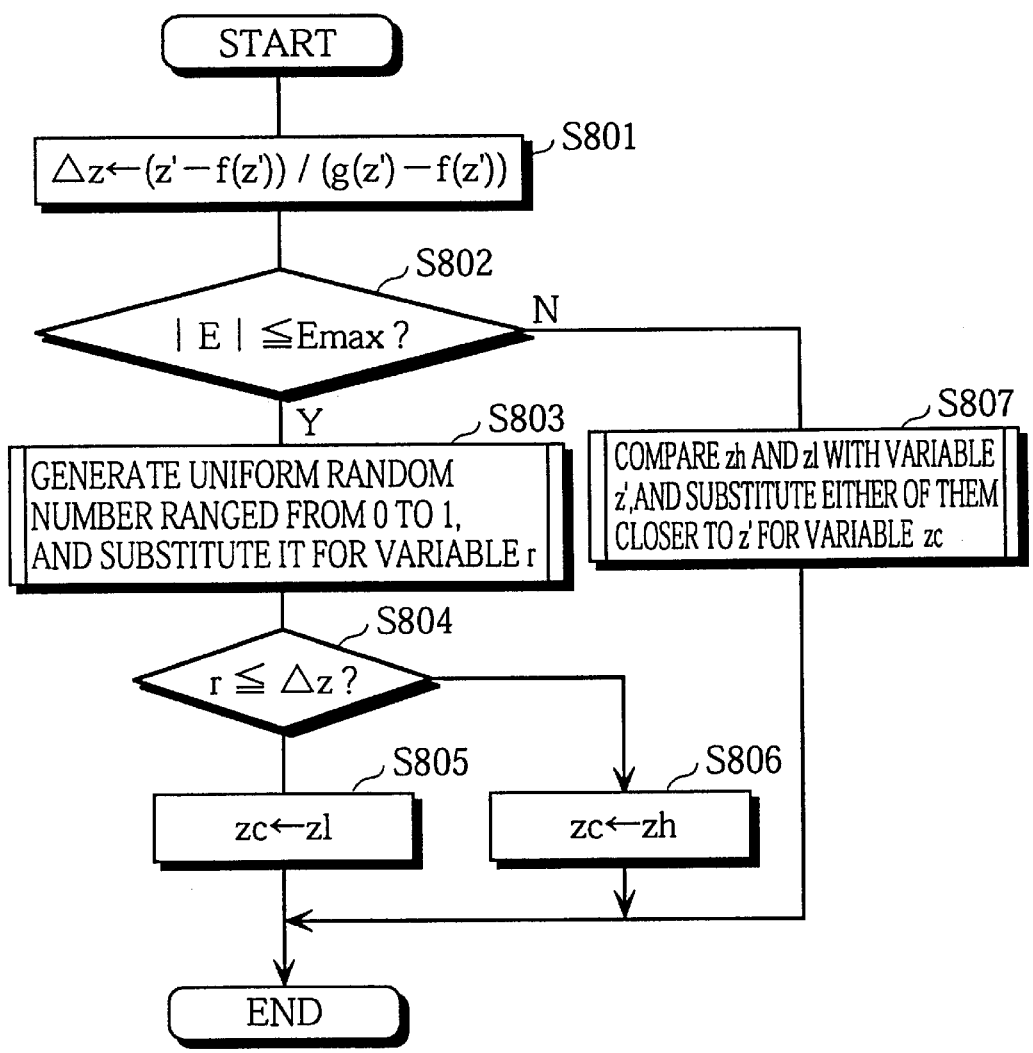
FIG. 22 is a flowchart illustrating how to select the converted value according to the second embodiment.

The following is an explanation of the operation of the image processing device having such construction. The operation of the image processing device differs from that in the first embodiment only at the point that the process, shown in Step 407 of the flowchart in FIG. 18 of Step 507 of the flowchart in FIG. 19, where one converted value is selected using a random number. The flowchart shown in FIG. 22 illustrates the different process. The following is an explanation of the specific process using the flowchart. Comparator 706 and selection probability calculation unit 707 calculate selection probability $\Delta z$ (Step 801). Condition judging unit 708 decides whether the diffusion error E calculated by diffusion error calculation unit 704 is equal to or smaller than value $E_{max}$ (Step 802).

The following process is the same as that of the image processing device in the first embodiment. In case that condition judging unit 708 decides the condition is satisfied in Step 802, converted data selection unit 710A in data conversion correction unit 710 compares the uniform random number r generated by random number generation unit 710B with selection probability $\Delta z$, and outputs f(z') as the converted value zc to terminal T when selection probability $\Delta z$ is equal to or smaller than the random number r, and outputs g(z') as the converted value zc to terminal T when selection probability $\Delta z$ is larger than the random number r (Step 804 to Step 806). On the other hand, when condition judging unit 708 decides the condition is not satisfied in Step 802, one of the converted values f(z') and g(z') closer to corrected Step is output as the converted value zc (Step 807).

In the second embodiment of the present invention, as in the first embodiment, the converted value is stochastically converged, even if a random number is used, due to the way selection probability $\Delta z$ is set and the nature of random numbers. Since the correction by the stochastic process using a random number is added to the conversion of the pixel data when the diffusion error E is small, the conversion of the pixel data is diffused even if the error diffusion by the error diffusion method does not work well. Therefore, the problem of the disappearance of fine lines is solved. The degree of roughness in the converted image is reduced compared to the image converted by the noise-adding type error diffusion method, since the correction by the stochastic process is performed only when the diffusion error is small, and no noise is added to the pixel data having large conversion errors around it. It is not necessary for the method in the second embodiment or the present invention to designate the region for every original image in advance as in the method in the first embodiment.

As mentioned above, the method in the second embodiment also solves the problem of the disappearance of fine lines with reducing the degree of roughness in the whole converted image.

Third Embodiment

The following is an explanation of the third embodiment of the present invention with reference to figures.

Figure 23:
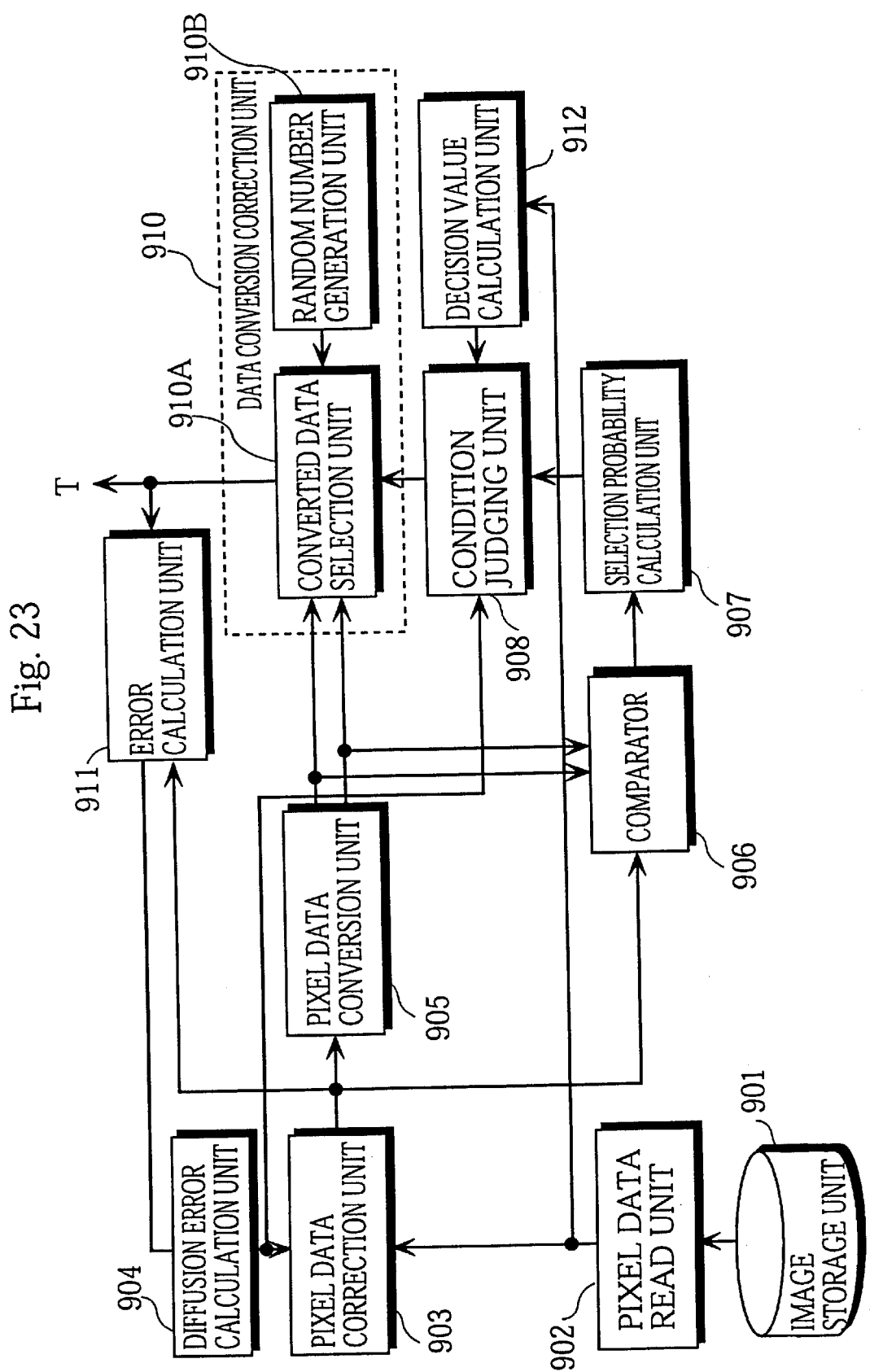
FIG. 23 is a block diagram illustrating the construction of the image processing device according to the third embodiment.

FIG. 23 in a block diagram of the image processing device according to the present embodiment. The image processing device differs from that in the first embodiment at the following points: the image processing device includes decision value calculation unit 912; the image processing device does not include region designation unit 209; the construction of condition judging unit 908 differs from the corresponding unit in the first embodiment; and condition judging unit 908 uses the value output by diffusion error calculation unit 904 and decision value calculation unit 912.

Figure 24:
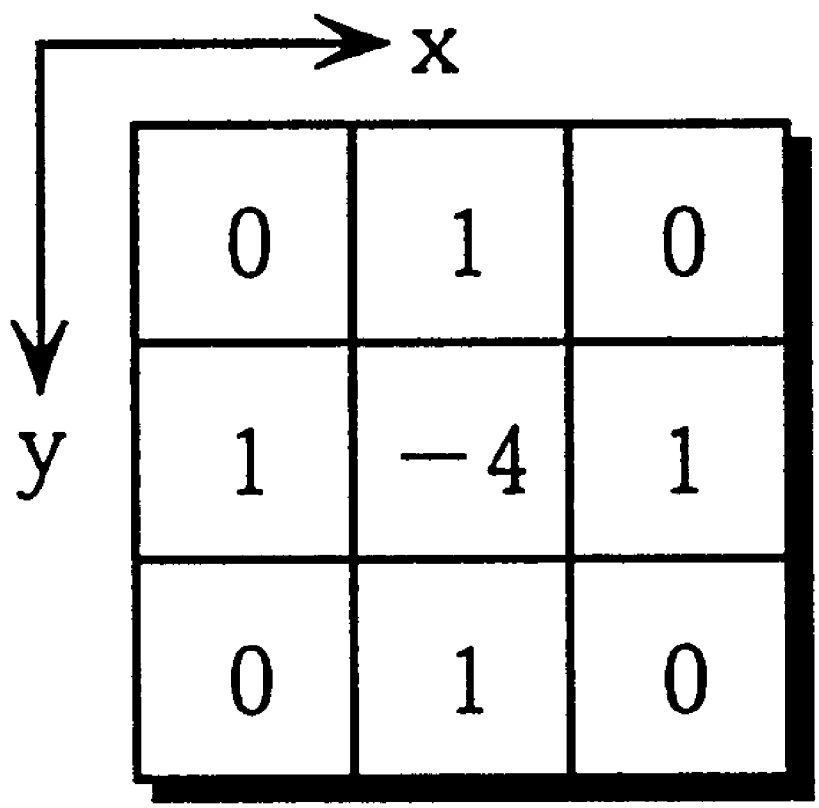
FIG. 24 is a two-dimensional Laplacian matrix.

Decision value calculation unit 912 calculates evaluation value C, corresponding to $E_{max}$ in the second embodiment, for each pixel. Decision value calculation unit 912 calculates evaluation value C from the pixel data and the pixel data of one or more of the surrounding pixels using an operation expression. In the present embodiment, evaluation value C is calculated from the pixel data and the pixel data of the surrounding pixels using the Laplacian matrix shown in FIG. 24, Equation (8), $$L=I(x-1,y)+I(x+1,y)+I(x,y+1)+I(x,y-1)-4I(x,y) \qquad \text{Equation (8)}$$

and Equation (9).

$$C=a\cdot|L|+b \qquad \text{Equation (9)}$$

The constants a and b are set at optimal values that can be round by experimentation or the like. A Laplacian matrix is used in the present embodiment in order to sharpen the edge of the converted image, however, it is obvious that the same effect can be obtained by using an operation expression based on a two-dimensional power spectrum. The same effect is also obtained by using the result of a mean value filter or a median filter.

Condition judging unit 908 is set to decide whether the diffusion error E calculated by diffusion error calculation unit 904 for the pixel data is equal to or smaller than the evaluation value C calculated by decision value calculation unit 912.

Figure 25:
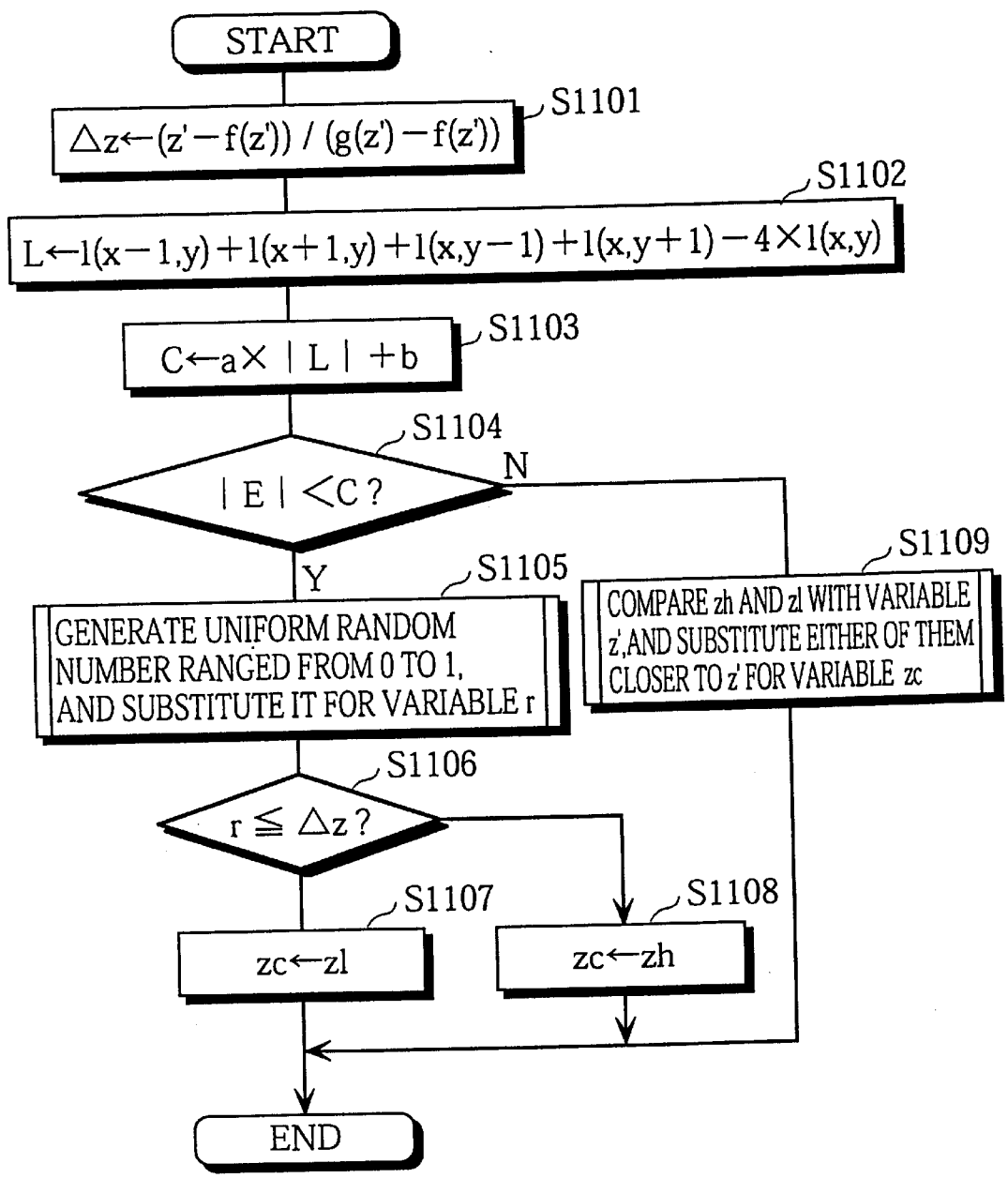
FIG. 25 is a flowchart illustrating how to select the converted value according to the third embodiment.

The following is an explanation of the operation of the image processing device having such construction. The operation of the image processing device in the present embodiment differs from that in the first embodiment only at the process shown in Step 407 of the flowchart in FIG. 18 or Step 507 of the flowchart in FIG. 19, where one converted value is selected using a random number. The flowchart shown in FIG. 25 illustrates the different process.

The following is an explanation of the specific process using the flowchart. Comparator 906 and selection probability calculation unit 907 calculate selection probability Δz (Step 1101). Decision value calculation unit 912 calclultates evaluation value C using above-mentioned Equation (7) and (8) from the pixel data and the pixel data of the surrounding pixels read out by pixel data read unit 902 (Step 1102 and Step 1103). Condition judging unit 908 decides whether the diffusion error E calculated by diffusion error calculation unit 904 is equal to or smaller than the evaluation value C (Step 1104).

The following process is the same as that of the image processing device in the first embodiment. In case that condition judging unit 908 decides the condition is satisfied in Step 1104, converted data selection unit 910A of data conversion correction unit 910 compares the uniform random number r generated by random number generation unit 910B with selection probability Δz, and outputs f(z') as the converted value zc to terminal T when selection probability Δz is equal to or smaller than the random number r, and outputs g(z') as the converted value zc to terminal T when selection probability Δz is larger than the random number r (Step 1106 to Step 1108). On the other hand, when condition judging unit 908 decides the condition is not satisfied in Step 1104, the closer of converted values f(z') and g(z') to corrected Step is output as the converted value zc (Step 1109).

In the third embodiment of the present invention, as in the first and second embodiments, the gradation value of the original image is preserved stochastically, even if a random number is used, due to the way selection probability Δz is set and the nature of random numbers. In the present embodiment, only when the diffusion error is equal to or smaller than the evaluation value C based on the Laplacian matrix, the stochastic process is performed in the conversion of the gradation value of the pixel. Since the Laplacian matrix is a high pass highlight filter, it reacts selectively to a character, a line, an outline of a face, and the like, and outputs the values having high magnitudes. Therefore, by the image processing device in the present embodiment, since the evaluation value C is small for the region where the gradation value changes gradually, the conventional error diffusion method is used in order to reduce the degree of roughness in the converted image. Since the evaluation value C is large for a line or a character, the stochastic process is performed in the conversion in order to convert a line or a character correctly. Consequently, not only the disappearance of fine lines but also the degree of roughness in the converted image is reduced. As mentioned later, a series of experimentations proves that the degree of roughness in the converted image is reduced compared to the noise adding type error diffusion method and the image processing method in the second embodiment.

As mentioned above, the method in the third embodiment also solves the problem of the disappearance of fine lines with reducing the degree of roughness in the whole converted image.

In the second and third embodiments, condition judging unit 708 and 908 decide the magnitude of the error diffusion coefficient. Instead of the error diffusion coefficient, the conversion error e calculated by error calculation unit 711 and 911 can be used. In other words, condition judging unit 708 and 908 can decide the magnitude of one or more conversion errors e of the converted pixel value around the pixel or the magnitude of the value calculated from the conversion errors by means of the operation expression. In this case, an appropriate modification of $E_{max}$ in the second embodiment and a or b in Equation (8) in the third embodiment are available.

Although one of the two converted data options is selected in each of the above-mentioned embodiments, more than two converted data options are possible.

Furthermore, although data conversion correction unit 210 or the like uses a uniform random number in each of the above mentioned embodiments, unless more than two converted values with selection probability 0, other random numbers having arbitrary distribution, including a Gaussian random number, are available. It is obvious that each random number is not necessarily generated independently.

Although the correction by the stochastic process is performed in the conversion by pixel data conversion unit 205 or the like by selecting one of the two converted values of the pixel data using a random number in each of the above-mentioned embodiments, the correction can be made by adding noise to the pixel data before input to pixel data conversion unit 205 or the like as in the conventional noise-adding type image processing device shown in FIG. 11. In this case, condition judging unit 208 or the like decides whether noise is added to the pixel data before input to pixel data conversion unit 205 or the like.

It is obvious that the above-mentioned image processing device is also available for the gradation conversion of each of three primary colors R, G, and B, and that the device is available for the gradation conversion of a colored image.

The following is an explanation of the result of the comparison between the gradation conversion by the image processing device of the prior art and that by the image processing device in each of the embodiment of the present invention.

Figure 12A:
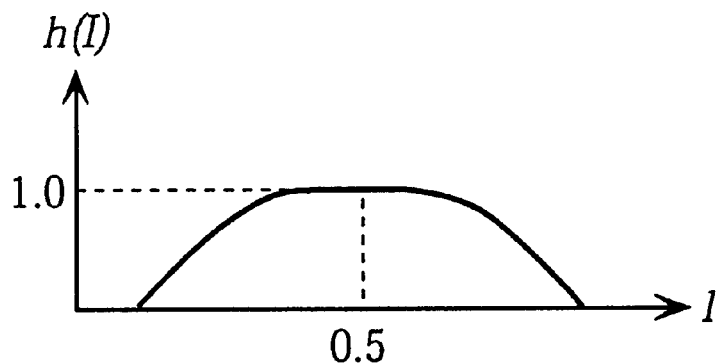
FIG. 12A is a weighting coefficient function adding 100% noise to the pixels having middle-level gradation value according to the conventional noise-adding type error diffusion method.
Figure 12B:
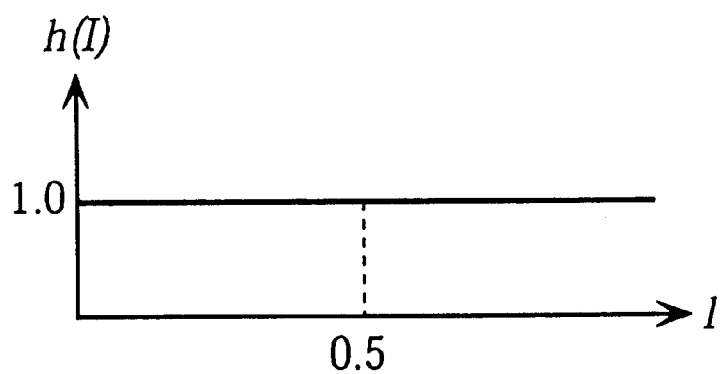
FIG. 12B is a weighting coefficient function adding 100% noise to the pixels regardless of their gradation value according to the conventional noise-adding type error diffusion method.
Figure 12C:
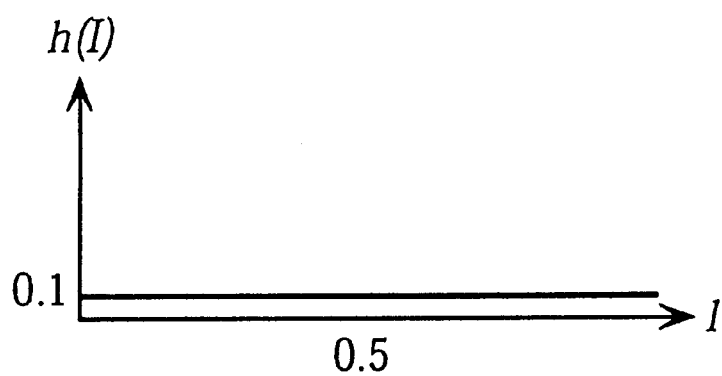
FIG. 12C is a weighting coefficient function adding 10% noise to the pixels regardless of their gradation value according to the conventional noise-adding type error diffusion method.
Figure 13:
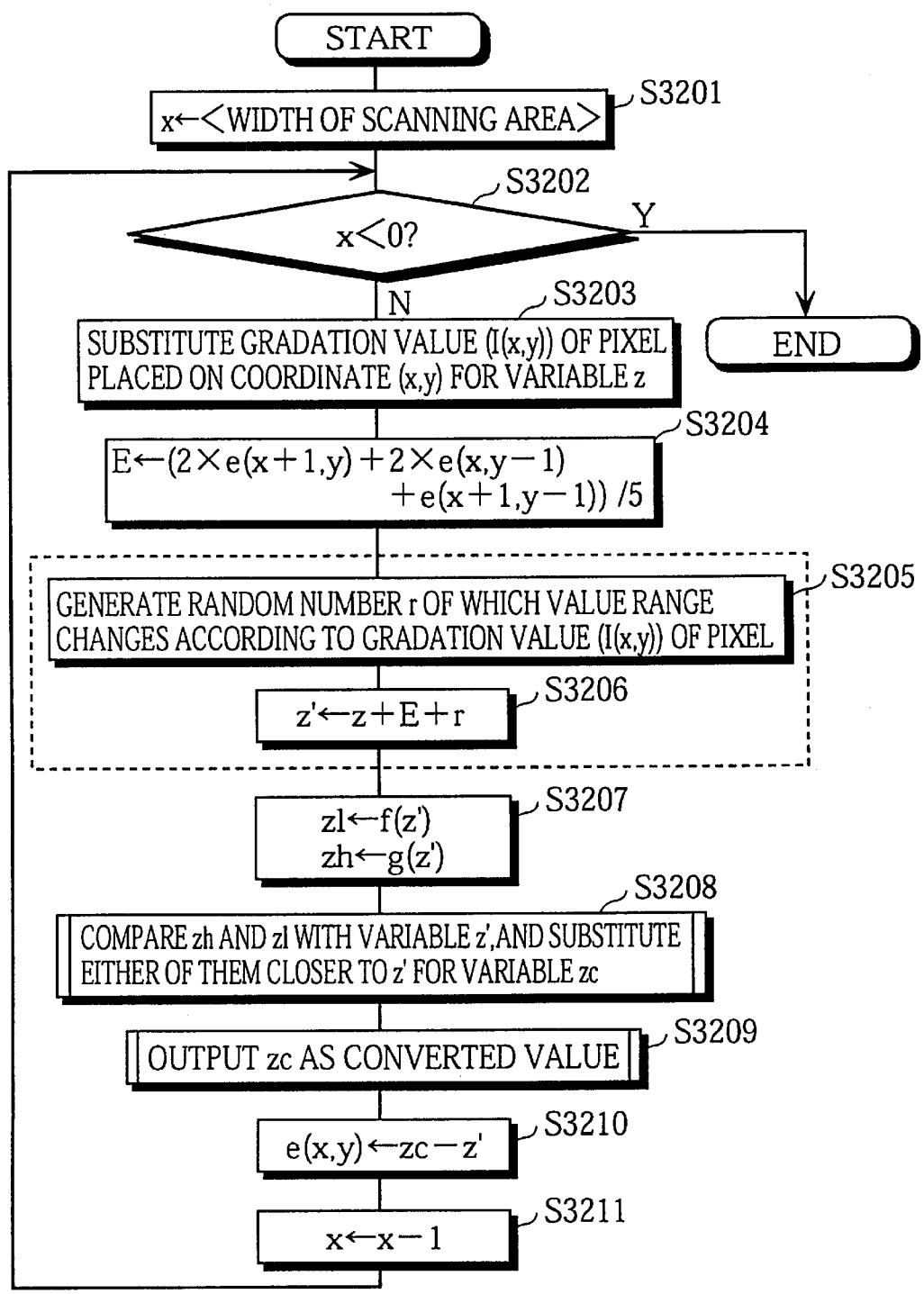
FIG. 13 is a flowchart illustrating the operation of the conversion process in the positive direction of the x-axis of the image processing device according to the conventional noise-adding type error diffusion method.
Figure 14:
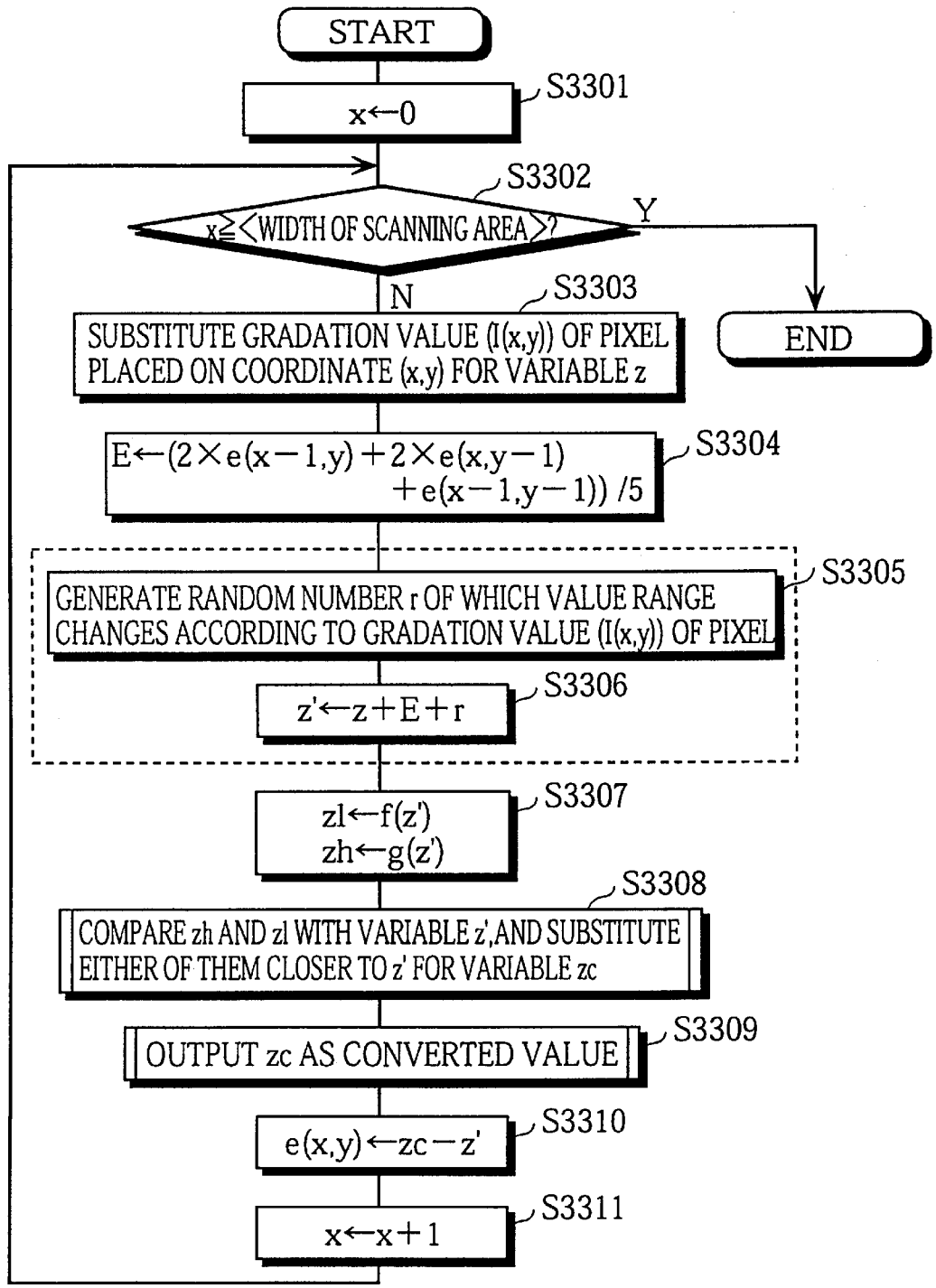
FIG. 14 is a flowchart illustrating the operation of the conversion process in the negative direction of the x-axis of the image processing device according to the conventional noise-adding type error diffusion method.
Figure 26:
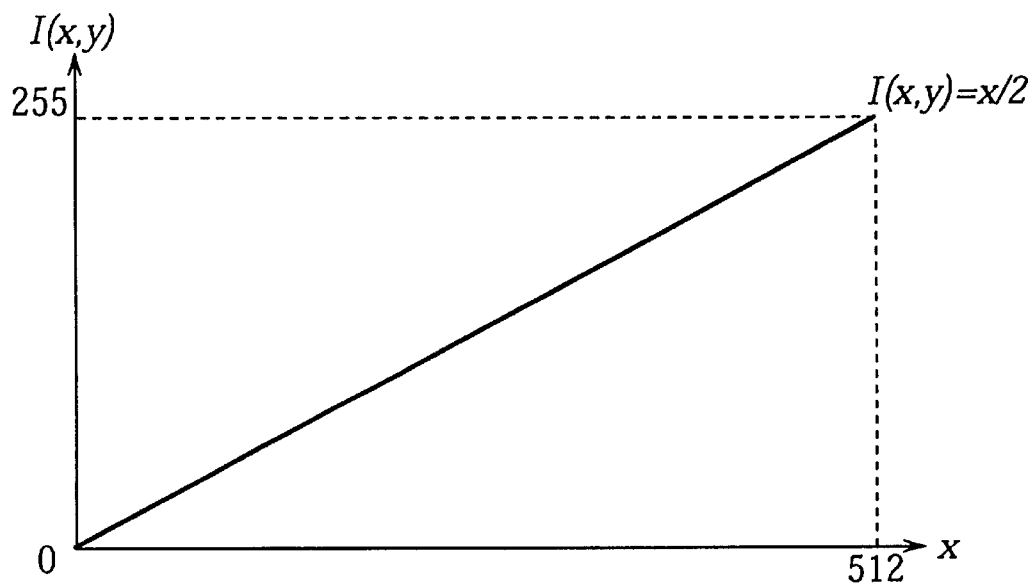
FIG. 26 shows the distribution of the gradation values in an original image with a gradual change in gradation values used in the experimentation in the embodiments.
Figures 27A, 27B:
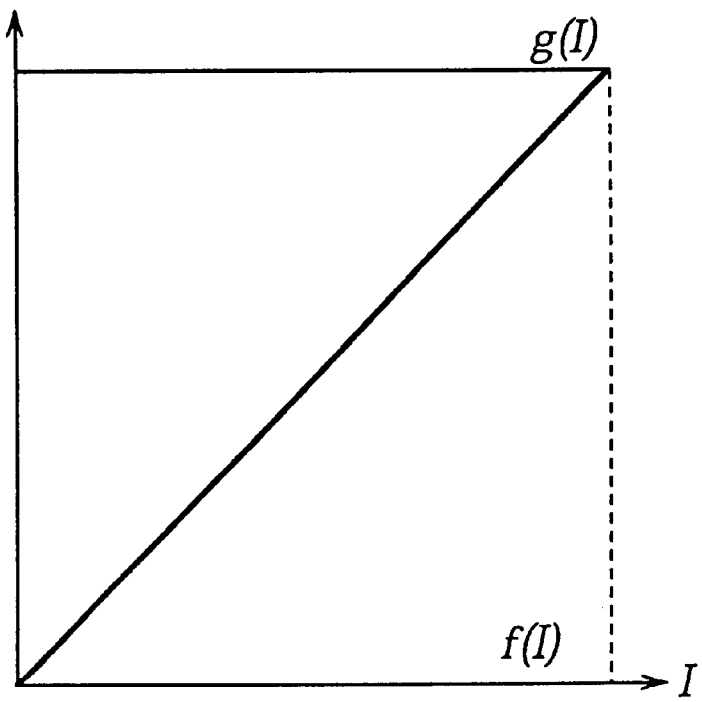
FIG. 27A is the table of the value for the ranges of the two functions included in the step functions for the binarization conversion used in the experimentation in the embodiments.
FIG. 27B shows the step functions for the binarization conversion used in the experimentation in the embodiments.
Figure 28A:
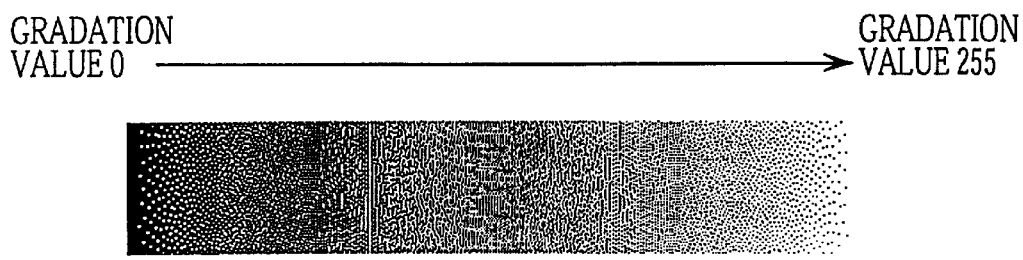
FIG. 28A is the result of the conversion of the original image having the gradation value distribution shown in FIG. 26 using the image processing device according to the conventional error diffusion method.
Figure 28B:
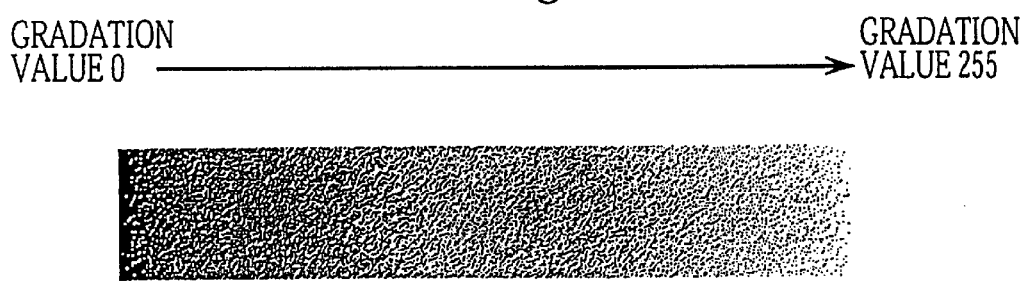
FIG. 28B is the result of the conversion of the original image having the gradation value distribution shown in FIG. 26 using the image processing device according to the conventional noise-adding type error diffusion method set to add 10% noise to the pixel data.
Figure 28C:
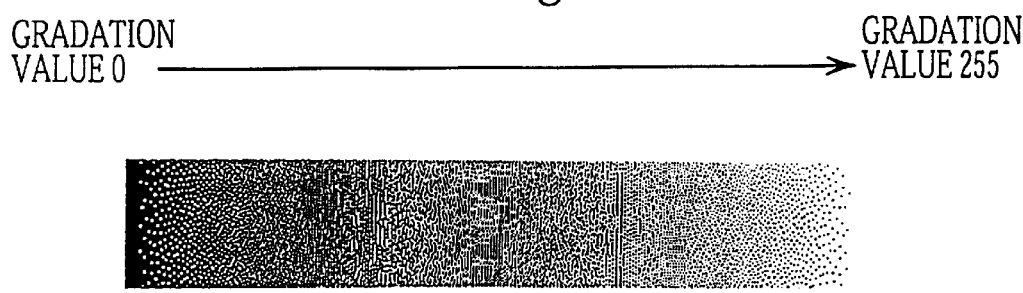
FIG. 28C is the result of the conversion of the original image having the gradation value distribution shown in FIG. 26 using the image processing device according to the conventional noise-adding type error diffusion method set to add 100% noise to the pixel data.
Figure 29A:
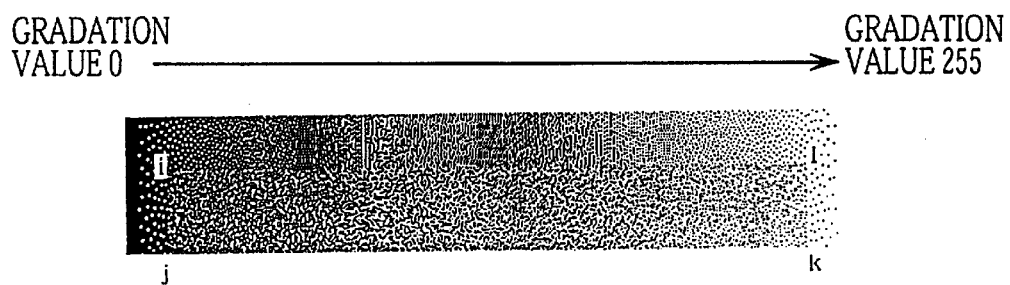
FIG. 29A is the result of the conversion of the original image having the gradation value distribution shown in FIG. 12 using the image processing device in the first embodiment.
Figure 29B:
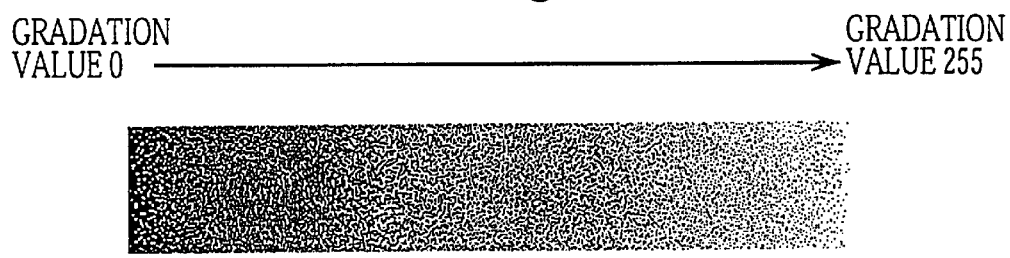
FIG. 29B is the result of the conversion of the original image having the gradation value distribution shown in FIG. 12 using the image processing device in the second embodiment.
Figure 29C:
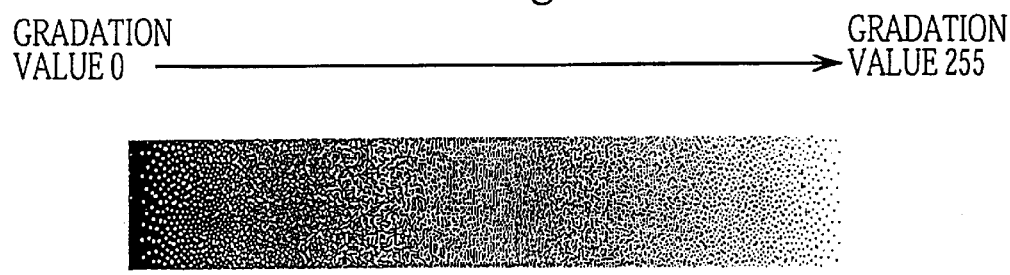
FIG. 29C is the result of the conversion of the original image having the gradition value distribution shown in FIG. 12 using the image processing device in the third embodiment.

Firstly, in order to compare the present invention with the prior art in regard to the appearance of moire patterns and the degree of roughness in a converted image, an image with 90 dots in height and 512 dots in width having the gradation distribution expressed by I(x,y)=x/2 shown in FIG. 26 is binarized using conversion functions shown in FIG. 27A and FIG. 27B. FIG. 28A to FIG. 28B show the result of the binarization conversion by the conventional image processing device. FIG. 29A to FIG. 29B show the result of the binarization conversion by the image processing device of the present invention. More specifically, FIG. 28A is the converted image by the conventional error diffusion method shown in FIG. 1. FIG. 28B is the converted image by the image processing device of the conventional noise-adding type error diffusion method shown in FIG. 11 set to add a degree of noise that is 100% of one step of the step function, where the noise is added using weighting coefficient functions shown in FIG. 12B regardless of the gradation value of the pixels. FIG. 28C is the converted image by the image processing device or the conventional noise-adding type error diffusion method shown in FIG. 11 set to add a degree of noise that is 10% of one step of the step function, where the noise is added using weighting coefficient functions shown in FIG. 12B regardless of the gradation value of the pixels. On the other hand, FIG. 29A is the converted image by the image processing device in the first embodiment. FIG. 29B is the converted image by the image processing device in the second embodiment. FIG. 29C is the converted image by the image processing device in the third embodiment. The square region surrounded by "i", "j", "k", and "l" in FIG. 29A is the region designated by region designation unit 209. $E_{max}$ in FIG. 29B is (g(I) f(I))/3=85. In FIG. 29C, a=0.5 and b=20.

Observation of FIG. 28A to FIG. 28C shows that moire patterns is noticeable in FIG. 28A, and the degree of roughness is conspicuous in FIG. 28B. Although FIG. 28C is the most improved converted image, moire patterns still appear there.

Further observation of FIG. 29A to FIG. 29C shows that in FIG. 29A the pattern of the converted gradation value of the pixels changes in the square region designated by region designation unit 209 and surrounded by "i", "j", "k", and "l". Consequently, no moire pattern appears in the square region. In FIG. 29B, due to the effect of condition judging unit 708 and data conversion correction unit 710, roughness and moire patterns appear less compared to the converted image shown in FIG. 28B, where theoretically the same level of noise is added. In FIG. 29C, the effect of decision value calculation unit 912, condition judging unit 908, and data conversion correction unit 910, results in less roughness then the converted image in FIG. 28B, where theoretically the same level of noise is added, and less than that in FIG. 29B. The result of the converted image in FIG. 29C resembles that in FIG. 28C in the degree of roughness. The converted image in FIG. 29C has weaker moire patterns than that in FIG. 28C.

Secondly, in order to compare the present invention with the prior art with regard to the disappearance of fine lines, an image with 256 dots in height and width and having 16 fine lines including pixels having gradation value "64" along the x-axis as shown in FIG. 30 is binarized similarly to the above-mentioned case.

FIG. 31A to FIG. 31C is the result of the binarization conversion using the conventional image processing device. FIG. 32A to FIG. 32C are the result of the binarization conversion using the image processing device of the present invention. FIG. 31A, FIG. 31B, and FIG. 31C are converted using the same image processing devices which are used in the conversion to FIG. 28A, FIG. 28B, and FIG. 28C, respectively. FIG. 32A, FIG. 32B, and FIG. 32C are converted by the image processing devices in the first, second, and third embodiment, respectively. In FIG. 32A, the center square region surrounded by "i", "j", "k", and "l" is the square designated by region designation unit 209.

Observation of FIG. 31A to FIG. 31C shows that 8 out of 16 lines disappear in all the converted images other than the image shown in FIG. 31B, where noise that is 100% of one step of the step functions is added to the pixels.

On the other hand, observation of FIG. 32A to FIG. 32C shows that in FIG. 32A all the lines appear in the square region surrounded by "i", "j", "k", and "l" in the converted image as a result of the selection process using a random number. In FIG. 32B and FIG. 32C, all 16 lines appear in the converted images.

Finally, in order to compare the present invention with the prior art in regard to the effect of line. disappearance on the gradation value in the converted image, an original image with the gradation values increasing gradually from the top to the bottom of the image as shown in FIG. 33A is binarized similarly to the above-mentioned case. FIG. 33B is the converted image using the same conventional noise-adding type error diffusion method as used in the conversion to the images in FIG. 28C and FIG. 31C, which is set to add a degree of noise that is 10% of one step of the step functions to the pixels. FIG. 33C is the converted image using the image processing device in the third embodiment of the present invention. Observation of FIG. 33B and FIG. 33C shows that the gradual change of the gradation value from "15" to "255" of the lines in the original image shown in FIG. 33A is not reproduce accurately in the converted image shown in FIG. 33B, where a partial reverse of the gradation value appears. More specifically, the converted gradation value of the pixels which originally have gradation value "63" constituting a line larger than that of the pixels which originally have gradation value "79" constituting another line in the converted image shown in FIG. 33B. It is because that the accumulated conversion error, caused by the disappearance from the converted image of the lines constituted by pixels originally having gradation values from "15" to "48", is reflected to augment the gradation value of the pixels which originally have gradation value "63" constituting the line in the converted image. On the other hand, such a reverse conversion of the gradation value does not appear in the converted image shown in FIG. 33C. The gradation value of the pixels constituting every line is reproduced accurately in FIG. 33C.

Although the present invention has been fully described by way of examples with reference to the accompanying drawings, it is to be noted that various changes and modifications will be apparent to those skilled in the art. Therefore, unless such changes and modifications depart from the scope of the present invention, they should by construed as being included therein.

What is claimed is:

1. An image processing device comprising a pixel data read means, a diffusion error calculation means, a pixel data correction means, a pixel data conversion means, a condition judging means, a random number generation means, a converted data selection means, and an error calculation means, wherein said pixel data read means reads a piece of pixel data;

said diffusion error calculation means calculates a diffusion error, by means of a predetermined operation expression, from at least one conversion error calculated by said error calculation means;

said pixel data correction means corrects a gradation value of said piece of pixel data read by said pixel data read means, by adding said diffusion error to said gradation value;

said pixel data conversion means converts said gradation value of said piece of pixel data corrected by said pixel data correction means by means of at least two predetermined functions, and outputs said gradation value converted by said pixel data conversion means as a converted gradation value option for each of said functions;

said condition judging means decides whether a pixel corresponding to said piece of pixel data satisfies a predetermined condition;

said random number generation means generates a random number;

said converted data selection means selects and outputs one out of said converted gradation value options by means of said random number generated by said random number generation means as a converted gradation value in case that said condition judging means decides said predetermined condition is satisfied, and selects and outputs one out of said converted gradation value options which is closest to said gradation value of said piece of pixel data corrected by pixel data correction means as said converted gradation value in case that said condition judging means decides said predetermined condition is not satisfied; and said error calculation means calculates and outputs said conversion error which is a difference between said converted value output by said converted data selection means and said gradation value of said piece of pixel data corrected by said pixel data correction means.

2. The image processing device according to claim 1, further comprising a region designation means for designating a region in an original image, wherein, said condition judging means decides whether said pixel is included in said region designated by said region designation means.

3. The image processing device according to claim 1, wherein said condition judging means decides whether said conversion error calculated by said error calculation means is equal to or smaller than a first value.

4. The image processing device according to claim 1, wherein said condition judging means decides whether said diffusion error calculated by said diffusion error calculation means is equal to or smaller than a second value.

5. The image processing device according to claim 3, further comprising:

a first decision value calculation means for calculating said first value by means of a first operation expression from said piece of pixel data and from at least one piece of data of surrounding pixels of said pixel.

6. The image processing device according to claim 4, further comprising:

a second decision value calculation means for calculating said second value by means of a second operation expression from said piece of pixel data and at least one piece of data of pixels surrounding said pixel.

7. An image processing method comprising:

a pixel data read step for reading a piece of pixel data;

a converted data option generation step for converting a gradation value of said piece of pixel data read by said pixel data read step by means of each of at least two predetermined functions, and for generating a plurality of converted gradation value options;

a condition judging step for deciding whether a pixel corresponding to said piece of pixel data read in said pixel data read step satisfies a predetermined condition;

a converted data extraction first step for selecting and for extracting by means of a stochastic process one out of said plurality of converted gradation value options as a converted gradation value in case that said piece of pixel data satisfies said predetermined condition; and a converted data extraction second step for selecting and for extracting one out of said plurality of converted gradation value options which is closest to said gradation value of said piece of pixel data as said converted gradation value in case that said piece of pixel data does not satisfy said predetermined condition.

8. The image processing method according to claim 7, wherein
in said converted data option generation step, said gradation value of said piece of pixel data is converted by using an error diffusion method, and said plurality of converted gradation value options are generated.

9. The image processing method according to claim 7, wherein said condition judging step decides whether said pixel is included in a predetermined region of an original image.

10. The image processing method according to claim 7, further comprising:

a converted error calculation step for calculating a conversion error which is a difference between one of said gradation value of said piece of pixel data before converted in one of said converted data extraction first step and in said converted data extraction second step, and said converted gradation value extracted in one of said converted data extraction first step and in said converted data extraction second step;

said condition judging step decides whether said conversion error calculated in said conversion error calculation step is equal to or smaller than a first value.

11. The image processing method according to claim 7, wherein said condition judging step decides whether a diffusion error used by said error diffusion method is equal to or smaller than a second value.

12. The image processing method according to claim 10, wherein said first value is calculated by means of a first operation expression from said piece of pixel data and at least one piece of data of pixels surrounding said pixel.

13. The image processing method according to claim 11, wherein said second value is calculated by means of a second operation expression from said piece of pixel data and at least one piece of data of pixels surrounding said pixel.

14. A storage medium read by a computer storing a program allowing said computer to perform an image processing procedure, wherein said image processing procedure comprising:

a pixel data read step for reading a piece of pixel data;

a converted data option generation step for converting said gradation value of said piece of pixel data read in pixel data read step by means of each of at least two predetermined functions, and for generating a plurality of converted gradation value options;

a condition judging step for deciding whether a pixel data corresponding to said piece of pixel data read in said pixel data reading step satisfies a predetermined condition;

a converted data extraction first step for selecting and extracting by means of a stochastic process one out of said plurality of converted gradation value options for said piece of pixel data as a converted gradation value; and a converted data extraction second step for selecting and extracting one out of said plurality of converted gradation value options which is closest to said gradation value of said piece of pixel data as said converted gradation value in case that said piece of pixel data does not satisfy said predetermined condition.

15. The storage medium according to claim 14, wherein
in said converted data option generation step, said gradation value of said piece of pixel data is converted by using an error diffusion method, and said plurality of converted gradation value options are generated.

16. The storage medium according to claim 15, wherein said condition judging step decides whether a pixel corresponding to said piece of pixel data is included in a predetermined region of an original image.

17. The storage medium according to claim 15, further comprising:

a conversion error calculation step for calculating a conversion error which is a difference between one of said gradation value of said piece of pixel data before converted in one of a probability data conversion step and in an improbability conversion step, and said converted gradation value converted in one of a probability data conversion step and in an improbability conversion step;

said condition judging step decides whether said conversion error calculated in said conversion error calculation step is equal to or smaller than a first value.

18. The storage medium according to claim 15, wherein said condition judging step decides whether a diffusion error used by said error diffusion method is equal to or smaller than a second value.

19. The storage medium according to claim 17, wherein said first value is calculated by means of a first operation expression from said piece of pixel data and at least one piece of data of pixels surrounding said pixel.

20. The storage medium according to claim 18, wherein said second value is calculated by means of a second operation expression from said piece of pixel data and at least one piece of data of pixels surrounding said pixel.

* * * * *